United States Patent
Koshiyama et al.

(10) Patent No.: US 12,420,344 B2
(45) Date of Patent: Sep. 23, 2025

(54) BASE MATERIAL FOR HARD SINTERED BODY, HARD SINTERED BODY, AND CUTTING TOOL

(71) Applicant: MITSUBISHI MATERIALS CORPORATION, Tokyo (JP)

(72) Inventors: Masayuki Koshiyama, Naka-gun (JP); Toshihiko Matsuo, Naka-gun (JP); Koji Fukata, Akashi (JP); Yoichi Hamada, Naka-gun (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 919 days.

(21) Appl. No.: 17/442,462

(22) PCT Filed: Mar. 27, 2020

(86) PCT No.: PCT/JP2020/014073
§ 371 (c)(1),
(2) Date: Sep. 23, 2021

(87) PCT Pub. No.: WO2020/196842
PCT Pub. Date: Oct. 1, 2020

(65) Prior Publication Data
US 2022/0161335 A1 May 26, 2022

(30) Foreign Application Priority Data
Mar. 27, 2019 (JP) .................. 2019-061639

(51) Int. Cl.
*B23C 5/10* (2006.01)
*B23P 15/34* (2006.01)

(52) U.S. Cl.
CPC ................ *B23C 5/10* (2013.01); *B23P 15/34* (2013.01); *B23C 2210/03* (2013.01);
(Continued)

(58) Field of Classification Search
CPC ................................................. B23C 2210/03
See application file for complete search history.

(56) References Cited

U.S. PATENT DOCUMENTS 9,643,334 B2 * 5/2017 Kasonde .............. C04B 35/5831
2003/0118413 A1 6/2003 Bruhn et al.
(Continued)

FOREIGN PATENT DOCUMENTS

CN 1379704 A 11/2002
CN 104053519 A 9/2014
(Continued)

OTHER PUBLICATIONS

Chinese Office Action mailed Oct. 28, 2022 for the corresponding Chinese Patent Application No. 202080023182.8 (24 pages including English translation).
(Continued)

*Primary Examiner* — Adam Krupicka
(74) *Attorney, Agent, or Firm* — Leason Ellis LLP; Melvin C. Ganer; Mitsuhiro Haraguchi

(57) ABSTRACT

A base material for a hard sintered body includes a pillar portion having a central axis and extending in the axial direction of the central axis. The pillar portion has a first outer peripheral portion, a second outer peripheral portion, and a protruding stripe portion. In the cross-sectional view, one side portion of the first outer peripheral portion extending in a circumferential direction or a radial direction is located inside the other side portion. In the cross-sectional view, one side portion of the second outer peripheral portion extending in the circumferential direction or the radial direction is located outside the other side portion in the radial direction. The protruding stripe portion is located in a connection portion between the other side portion of the first
(Continued)

outer peripheral portion and one side portion of the second outer peripheral portion, and protrudes outward.

8 Claims, 16 Drawing Sheets

(52) U.S. Cl.
CPC .. *B23C 2226/125* (2013.01); *B23C 2226/315* (2013.01); *B23C 2240/08* (2013.01)

(56) References Cited

U.S. PATENT DOCUMENTS

| | | | |
|---|---|---|---|
| 2018/0345380 A1 | 12/2018 | Higashi et al. | |
| 2018/0369924 A1 | 12/2018 | Higashi et al. | |

FOREIGN PATENT DOCUMENTS

| | | | |
|---|---|---|---|
| CN | 104153713 | A | 11/2014 |
| CN | 109317682 | A | 2/2019 |
| CN | 109414767 | A | 3/2019 |
| JP | 10113808 | A | 5/1998 |
| JP | 10113813 | A | 5/1998 |
| JP | 3055803 | B | 6/2000 |
| JP | 5906355 | B | 4/2016 |
| WO | 0126856 | A1 | 4/2001 |
| WO | WO-2018/066231 | A1 | 4/2018 |
| WO | 2018122166 | A1 | 7/2018 |

OTHER PUBLICATIONS

European Search Report mailed Nov. 7, 2022 for the corresponding European Patent Application No. 20777061.1 (11 pages).
International Search Report mailed Jun. 9, 2020 for the corresponding PCT International Application No. PCT/JP2020/014073.
Chinese Office Action mailed May 23, 2023 for the corresponding Chinese Patent Application No. 202080023182.8 (28 pages including English translation).

* cited by examiner

BASE MATERIAL FOR HARD SINTERED BODY, HARD SINTERED BODY, AND CUTTING TOOL

CROSS-REFERENCE TO RELATED PATENT APPLICATIONS

This application is a U.S. National Phase Application under 35 U.S.C. § 371 of International Patent Application No. PCT/JP2020/014073 filed on Mar. 27, 2020 and claims the benefit of priority to Japanese Patent Application No. 2019-061639 filed on Mar. 27, 2019, the contents of both of which are incorporated herein by reference in their entireties. The International Application was published in Japanese on Oct. 1, 2020 as International Publication No. WO/2020/196842 under PCT Article 21(2).

FIELD OF THE INVENTION

The present invention relates to a base material for a hard sintered body, a hard sintered body, and a cutting tool.

BACKGROUND OF THE INVENTION

In the related art, for example, a cutting tool such as an end mill, a reamer, and a drill is known. The cutting tool is manufactured by performing a grinding operation on a columnar tool material to form a chip discharge groove or a cutting edge. The tool material is manufactured by brazing and bonding a hard sintered body forming a cutting portion and a shank made of cemented carbide to each other.

The hard sintered body includes a multi-stage columnar base material and a cylinder portion that covers a smaller-diameter portion of the base material. The base material is made of cemented carbide, and the cylinder portion is made of polycrystalline diamond (PCD) or polycrystalline cubic boron nitride (PcBN). The base material and the cylinder portion are sintered integrally to form the hard sintered body. For example, as the hard sintered body in the related art, those disclosed in Japanese Patent No. 5906355 and Japanese Patent No. 3055803 are known.

CITATION LIST

Patent Documents

[Patent Document 1]
Japanese Patent No. 5906355
[Patent Document 2]
Japanese Patent No. 3055803

Technical Problem

For example, when the hard sintered body in the related art is used as the cutting tool (rotary cutting tool) such as the end mill, the reamer, and the drill, there is a possibility that cracks or chips may occur near an interface between the base material and the cylinder portion. Specifically, out of loads applied to the cutting tool during a cutting operation, a load applied in a direction perpendicular to a central axis of the tool is applied along the interface between the base material and the cylinder portion, and a force in a shearing direction acts. Accordingly, it is considered that the above-described problem occurs.

When a cutting condition is adjusted to reduce the load applied to the cutting tool, for example, by reducing a feed amount during the cutting operation, machining efficiency is lowered. In addition, a machining demand for a difficult-to-cut material such as carbon fiber reinforced plastic (CFRP) tends to increase, and it is expected that the load applied to the cutting tool increases.

In view of the above-described circumstances, one object of the present invention is to provide a base material for a hard sintered body, a hard sintered body, and a cutting tool which are capable of preventing occurrence of cracks or chips near an interface between a base material and a cylinder portion.

SUMMARY OF THE INVENTION

Solution to Problem

According to an aspect of the present invention, there is provided a base material for a hard sintered body including a pillar portion having a central axis and extending in an axial direction of the central axis. The pillar portion has a first outer peripheral portion disposed in an outer peripheral portion of the pillar portion, and forming a part of the outer peripheral portion, a second outer peripheral portion disposed in the outer peripheral portion of the pillar portion, and forming a part of the outer peripheral portion, and a protruding stripe portion of the base material located in a connection portion between the first outer peripheral portion and the second outer peripheral portion which are connected to each other in a cross-sectional view perpendicular to the central axis, and extending in the axial direction. In the cross-sectional view, one side portion of the first outer peripheral portion extending in a circumferential direction or a radial direction is located inside the other side portion in the radial direction. In the cross-sectional view, one side portion of the second outer peripheral portion extending in the circumferential direction or the radial direction is located outside the other side portion in the radial direction. The protruding stripe portion of the base material is located at a connection portion between the other side portion of the first outer peripheral portion and one side portion of the second outer peripheral portion, and protrudes outward in the radial direction.

The base material for the hard sintered body of the present invention has the protruding stripe portion of the base material protruding outward in the radial direction. In addition, the cylinder portion sintered integrally with the base material is provided with a portion (recessed stripe portion of the cylinder portion (to be described later)) bonded to the protruding stripe portion of the base material. Therefore, when the hard sintered body in which the base material and the cylinder portion are sintered is subjected to a cutting operation by using the cutting portion of the cutting tool, a load applied to the cutting tool in the circumferential direction can be received by the protruding stripe portion of the base material. In this manner, out of loads applied to the cutting tool during the cutting operation, it is possible to prevent a possibility that a load applied in a direction perpendicular to the central axis of the tool may act along an interface between the base material and the cylinder portion. That is, a shearing force along the interface can be reduced, and it is possible to prevent occurrence of cracks or chips near the interface between the base material and the cylinder portion. Therefore, fracturing resistance of the cutting tool manufactured by using the hard sintered body can be improved, and the tool life can be extended.

In the base material for the hard sintered body, the protruding stripe portion of the base material may have a sharp angle at an outer end of the protruding stripe portion of the base material in the radial direction.

In this case, a function (action) of the protruding stripe portion of the base material described above is further improved.

In the base material for the hard sintered body, in the cross-sectional view, the protruding stripe portion of the base material may have a convex curve shape.

In this case, when the hard sintered body in which the base material and the cylinder portion are sintered is subjected to a cutting operation by using the cutting portion of the cutting tool, it is possible to prevent a possibility that the load may be concentrated on a tip (outer end in the radial direction) in the protruding stripe portion of the base material. Therefore, it is possible to easily prevent the occurrence of cracks or chips near the protruding stripe portion of the base material.

In the base material for the hard sintered body, it is preferable to adopt a configuration as follows. A plurality of the first outer peripheral portions are provided. A plurality of the second outer peripheral portions are provided. A plurality of the protruding stripe portion of the base materials are provided at an interval from each other in the circumferential direction.

In this case, when the hard sintered body in which the base material and the cylinder portion are sintered is subjected to a cutting operation by using the cutting portion of the cutting tool, the above-described function of the protruding stripe portion of the base materials can be obtained at a plurality of locations in the circumferential direction of the cutting tool. Therefore, it is possible to stably prevent the occurrence of cracks or chips near the interface between the base material and the cylinder portion, and it is possible to further improve the fracturing resistance of the cutting tool.

In the base material for the hard sintered body, it is preferable that in the cross-sectional view, the plurality of protruding stripe portions of the base material are disposed rotationally symmetrically around the central axis.

In this case, when the hard sintered body in which the base material and the cylinder portion are sintered is subjected to a cutting operation by using the cutting portion of the cutting tool, the load evenly acts on each of the protruding stripe portion of the base materials. That is, it is possible to prevent a possibility that a heavy load may continuously act on a specific protruding stripe portion of the base material, and it is possible to more stably prevent the occurrence of cracks or chips near the interface between the base material and the cylinder portion.

In the base material for the hard sintered body, it is preferable to adopt a configuration as follows. The pillar portion has a base material recessed stripe portion located in the connection portion between the first outer peripheral portion and the second outer peripheral portion which are connected to each other in the cross-sectional view, and extending in the axial direction. The base material recessed stripe portion is located in a connection portion between one side portion of the first outer peripheral portion and the other side portion of the second outer peripheral portion, and is recessed inward in the radial direction.

In this case, since the base material recessed stripe portion is provided, it is possible to easily face the first outer peripheral portion in the circumferential direction. Therefore, when the hard sintered body in which the base material and the cylinder portion are sintered is subjected to a cutting operation by using the cutting portion of the cutting tool, the load can be more easily received by the first outer peripheral portion. In addition, in the base material, it is possible to more freely dispose the protruding stripe portion of the base material or the first outer peripheral portion, and it is possible to easily cope with various types of the hard sintered bodies used in various types of the cutting tools.

In the base material for the hard sintered body, it is preferable that in the cross-sectional view, the pillar portion has a polygonal shape.

In this case, a configuration of the present invention can be easily realized, and can be easily manufactured.

In addition, according to another aspect of the present invention, there is provided a hard sintered body including a base material for a hard sintered body including a pillar portion having a central axis and extending in an axial direction of the central axis, and a cylinder portion having a cylindrical shape that covers the pillar portion from an outside in a radial direction, having a lower coefficient of linear expansion and a higher hardness than the base material for the hard sintered body, and sintered integrally with the base material for the hard sintered body. The pillar portion has a first outer peripheral portion disposed in an outer peripheral portion of the pillar portion, and forming a part of the outer peripheral portion. In a cross-sectional view perpendicular to the central axis, one side portion of the first outer peripheral portion extending in a circumferential direction or the radial direction is located inside the other side portion in the radial direction. The cylinder portion has a first inner peripheral portion disposed in an inner peripheral portion of the cylinder portion, and forming a part of the inner peripheral portion. In the cross-sectional view, one side portion of the first inner peripheral portion extending in the circumferential direction or the radial direction is located inside the other side portion in the radial direction. The first outer peripheral portion and the first inner peripheral portion are bonded to each other.

In addition, according to still another aspect of the present invention, there is provided a cutting tool including a cutting portion in which a chip discharge groove and a cutting edge which extend in an axial direction are provided in the outer peripheral portion of the hard sintered body, and a shank connected to the cutting portion in the axial direction. The cutting edge is disposed in the cylinder portion.

In the hard sintered body and cutting tool of the present invention, in the cross-sectional view perpendicular to the central axis, one side portion of the first outer peripheral portion of the base material is located inside the other side portion in the radial direction. That is, the first outer peripheral portion faces the circumferential direction. In addition, in the cross-sectional view, one side portion of the first inner peripheral portion of the cylinder portion is located inside the other side portion in the radial direction. That is, the first inner peripheral portion faces the circumferential direction. Then, the first outer peripheral portion and the first inner peripheral portion which face the circumferential direction are bonded to each other.

When the hard sintered body is subjected to a cutting operation by using the cutting portion of the cutting tool, the first outer peripheral portion adopts a posture facing a tool rotation direction. In this manner, the load applied to the cutting tool in the circumferential direction can be received by the first outer peripheral portion of the base material. In this manner, out of loads applied to the cutting tool during the cutting operation, it is possible to prevent a possibility that a load applied in a direction perpendicular to the central axis of the tool may act along an interface between the base material and the cylinder portion. That is, a shearing force along the interface can be reduced, and it is possible to prevent occurrence of cracks or chips near the interface between the base material and the cylinder portion. Therefore, fracturing resistance of the cutting tool manufactured by using the hard sintered body can be improved, and the tool life can be extended.

In the hard sintered body, it is preferable to adopt a configuration as follows. The first outer peripheral portion is located inward in the radial direction toward one side in the circumferential direction. The first inner peripheral portion is located inward in the radial direction toward one side in the circumferential direction.

In this case, the first outer peripheral portion of the base material faces one side in the circumferential direction. When the hard sintered body is subjected to a cutting operation by using the cutting portion of the cutting tool, one side in the circumferential direction is set as the tool rotation direction. In this manner, the load applied to the cutting tool in the circumferential direction can be received by the first outer peripheral portion of the base material. In this manner, out of the loads applied to the cutting tool during the cutting operation, it is possible to prevent a possibility that the load applied in the direction perpendicular to the central axis of the tool may act along the interface between the base material and the cylinder portion, and it is possible to prevent the occurrence of cracks or chips near the interface between the base material and the cylinder portion.

In the hard sintered body, it is preferable to adopt a configuration as follows. The pillar portion has a second outer peripheral portion disposed in the outer peripheral portion of the pillar portion, and forming a part of the outer peripheral portion, and a protruding stripe portion of the base material located in a connection portion between the first outer peripheral portion and the second outer peripheral portion which are connected to each other in the cross-sectional view, and extending in the axial direction. In the cross-sectional view, one side portion of the second outer peripheral portion extending in the circumferential direction or the radial direction is located outside the other side portion in the radial direction. The protruding stripe portion of the base material is located in a connection portion between the other side portion of the first outer peripheral portion and one side portion of the second outer peripheral portion, and protrudes outward in the radial direction. The cylinder portion has a second inner peripheral portion disposed in an inner peripheral portion of the cylinder portion, and forming a part of the inner peripheral portion, and a recessed stripe portion of the cylinder portion located in the connection portion between the first inner peripheral portion and the second inner peripheral portion which are connected to each other in the cross-sectional view, and extending in the axial direction. In the cross-sectional view, one side portion of the second inner peripheral portion extending in the circumferential direction or the radial direction is located outside the other side portion in the radial direction. The recessed stripe portion of the cylinder portion is located in a connection portion between the other side portion of the first inner peripheral portion and one side portion of the second inner peripheral portion, and is recessed outward in the radial direction. The second outer peripheral portion and the second inner peripheral portion are bonded to each other. The protruding stripe portion of the base material and the recessed stripe portion of the cylinder portion are bonded to each other.

In this case, the base material has the protruding stripe portion of the base material protruding outward in the radial direction, and the recessed stripe portion of the cylinder portion is bonded to the protruding stripe portion of the base material. Therefore, when the hard sintered body is subjected to a cutting operation by using the cutting portion of the cutting tool, the load applied to the cutting tool in the circumferential direction can be received by the protruding stripe portion of the base material. In this manner, out of the loads applied to the cutting tool during the cutting operation, it is possible to prevent a possibility that the load applied in the direction perpendicular to the central axis of the tool may act along the interface between the base material and the cylinder portion, and it is possible to further prevent the occurrence of cracks or chips near the interface between the base material and the cylinder portion.

In the hard sintered body, it is preferable to adopt a configuration as follows. In the cross-sectional view, an angle at which the first outer peripheral portion is inclined with respect to a second straight line passing over the outer end portion of the first outer peripheral portion in the radial direction and being orthogonal to a first straight line passing through an outer end portion of the first outer peripheral portion in the radial direction and the central axis and extending in the radial direction, is 4° or larger and 170° or smaller.

In the cross-sectional view perpendicular to the central axis, the second straight line orthogonal to the first straight line passing through the outer end portion of the first outer peripheral portion in the radial direction and the central axis, and passing over the outer end portion of the first outer peripheral portion in the radial direction corresponds to a tangent line of a circumscribed circle of the pillar portion passing through the outer end portion of the first outer peripheral portion in the radial direction.

In a case where the angle at which the first outer peripheral portion is inclined with respect to the second straight line in the cross-sectional view perpendicular to the central axis is 4° or larger, when the hard sintered body in which the base material and the cylinder portion are sintered is subjected to a cutting operation using the cutting portion of the cutting tool, the first outer peripheral portion adopts a posture facing the tool rotation direction. In this manner, the load applied to the cutting tool in the circumferential direction can be stably received by the first outer peripheral portion of the base material. In this manner, out of the loads applied to the cutting tool during the cutting operation, it is possible to prevent a possibility that the load applied in the direction perpendicular to the central axis of the tool may act along the interface between the base material and the cylinder portion, and it is possible to further prevent the occurrence of cracks or chips near the interface between the base material and the cylinder portion.

In addition, in a case where the angle at which the first outer peripheral portion is inclined with respect to the second straight line in the cross-sectional view perpendicular to the central axis is 170° or smaller, the wall thickness near the first outer peripheral portion of the base material is secured, and rigidity of the base material is secured. For example, it is possible to prevent a problem that the partially thinned base material causes a starting point of cracks. Therefore, the function of the first outer peripheral portion is stabilized.

In the hard sintered body, it is preferable to adopt a configuration as follows. A plurality of the first outer peripheral portions are provided at an interval from each other in the circumferential direction. In the cross-sectional view, all of the angles of the plurality of first outer peripheral portions are equal to each other.

In this case, when the hard sintered body in which the base material and the cylinder portion are sintered is subjected to a cutting operation by using the cutting portion of the cutting tool, the above-described function of the first outer peripheral portion is obtained at a plurality of locations in the circumferential direction of the cutting tool, and the load evenly acts on each of the first outer peripheral portions. That is, it is possible to prevent a possibility that a heavy load may continuously act on the specific first outer peripheral portion, and it is possible to more stably prevent the occurrence of cracks or chips near the interface between the base material and the cylinder portion.

In the hard sintered body, it is preferable to adopt a configuration as follows. The base material for the hard sintered body has a Young's modulus of 300 GPa or higher. The cylinder portion has a Young's modulus of 600 GPa or higher.

When the Young's modulus of the base material for the hard sintered body is 300 GPa or higher, the rigidity can be stably secured, for example, in a case where the base material is used for the cutting tool such as an end mill.

In addition, when the Young's modulus of the cylinder portion is 600 GPa or higher, wear resistance can be stably secured, for example, in a case where the cylinder portion is used for the cutting tool such as the end mill.

In the hard sintered body, it is preferable to adopt a configuration as follows. The base material for the hard sintered body is made of any one of cemented carbide, cermet, and ceramics. The cylinder portion is made of any one of polycrystalline diamond and polycrystalline cubic boron nitride.

In the cutting tool, it is preferable that when viewed in the radial direction, the other side portion of the first outer peripheral portion and the cutting edge intersect with each other.

In this case, when the cutting operation is performed by the cutting tool, the load applied to the cutting edge in the circumferential direction can be more easily received by the first outer peripheral portion of the base material. Therefore, it is possible to prevent the occurrence of cracks or chips near the interface between the base material and the cylinder portion. The fracturing resistance of the cutting tool can be improved, and the tool life can be extended.

In the cutting tool, it is preferable to adopt a configuration as follows. A plurality of the first outer peripheral portions are provided at an interval from each other in the circumferential direction. One or more of the cutting edges are provided. The number of the first outer peripheral portions is equal to or more than the number of the cutting edges.

In this case, when viewed in the radial direction, the first outer peripheral portion is likely to be disposed by intersecting with the cutting edge. When the cutting operation is performed by the cutting tool, the load applied to each of cutting edges in the circumferential direction can be stably and easily received by each of the first outer peripheral portions of the base material. Therefore, it is possible to prevent the occurrence of cracks or chips near the interface between the base material and the cylinder portion. The fracturing resistance of the cutting tool can be improved, and the tool life can be extended.

Advantageous Effects of Invention

According to the base material for the hard sintered body, the hard sintered body, and the cutting tool in an aspect of the present invention, it is possible to prevent the occurrence of cracks or chips near the interface between the base material and the cylinder portion.

DETAILED DESCRIPTION OF THE INVENTION

First Embodiment

Figure 1A:
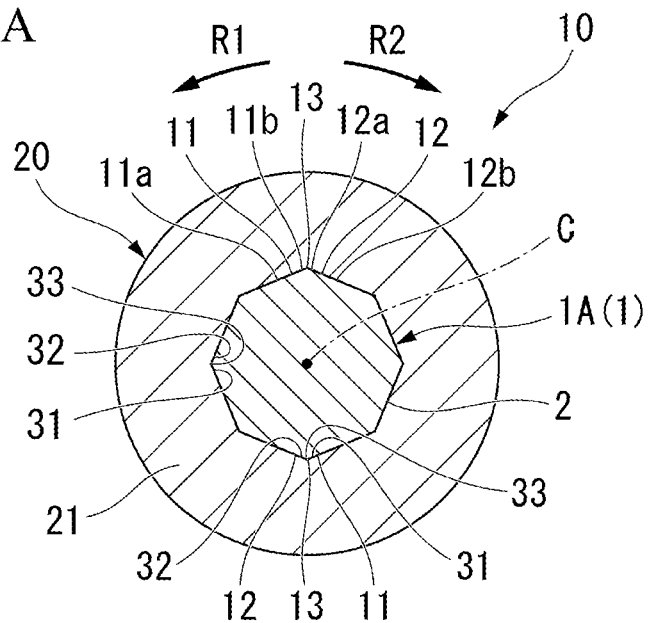
FIG. 1A is a cross-sectional view showing a hard sintered body of a first embodiment.
Figure 2:
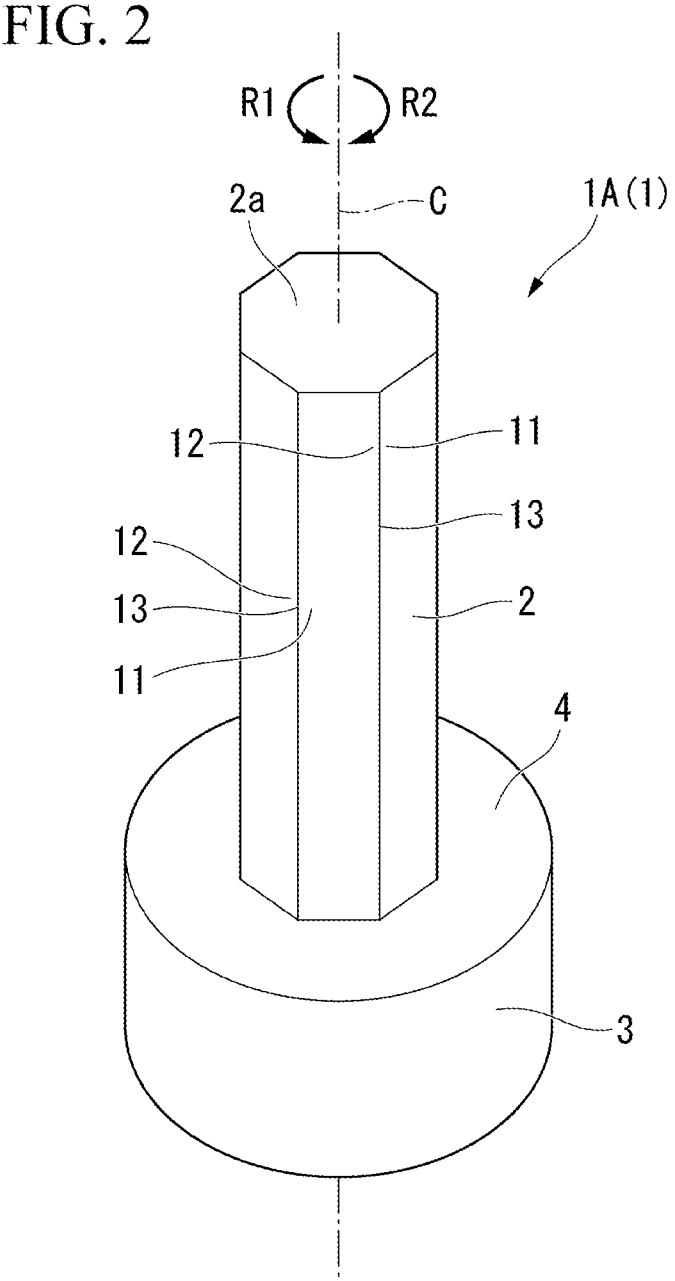
FIG. 2 is a perspective view showing the base material for the hard sintered body of the first embodiment.
Figure 3:
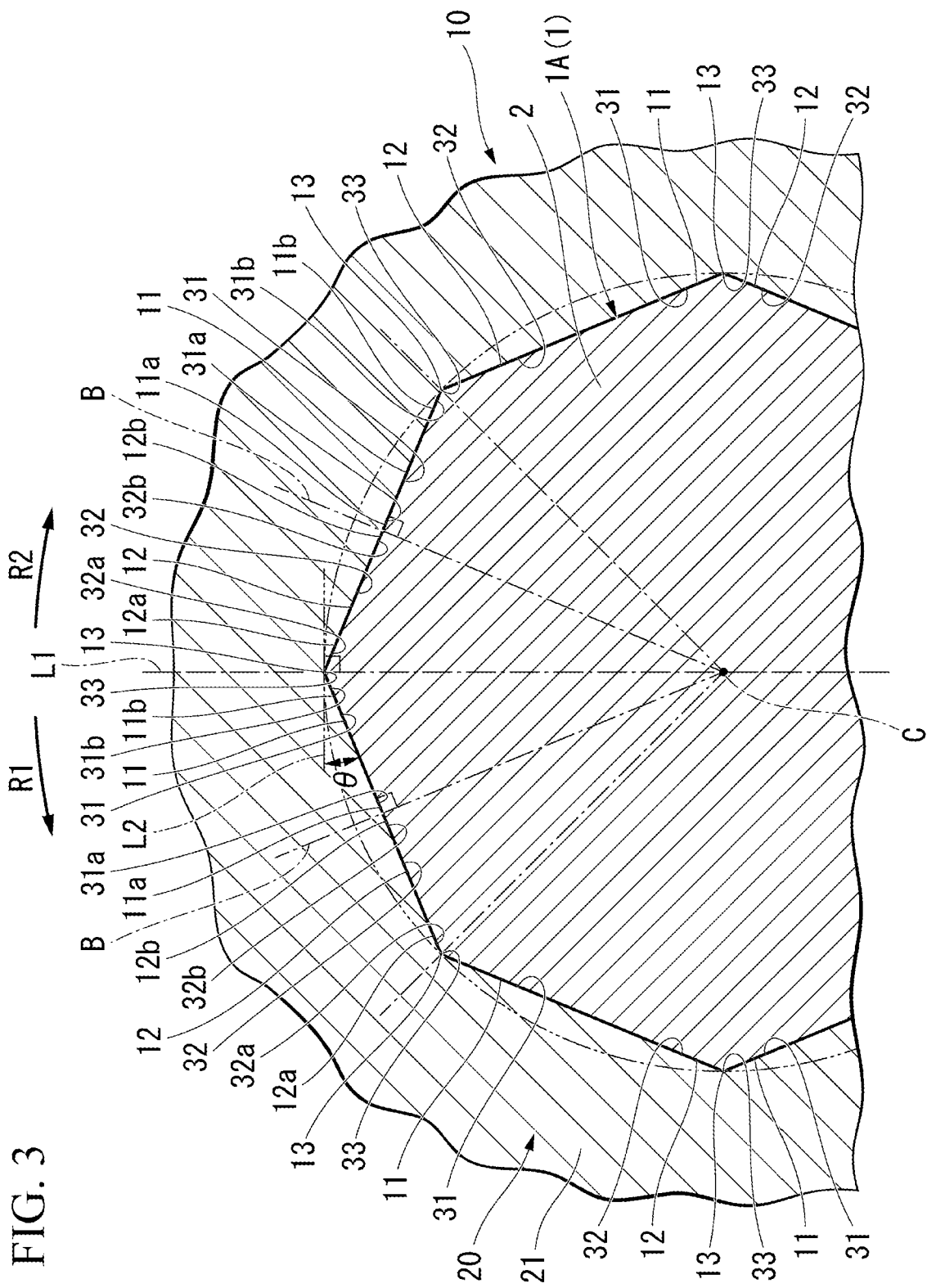
FIG. 3 is an enlarged cross-sectional view showing a portion of the hard sintered body of the first embodiment.
Figure 4:
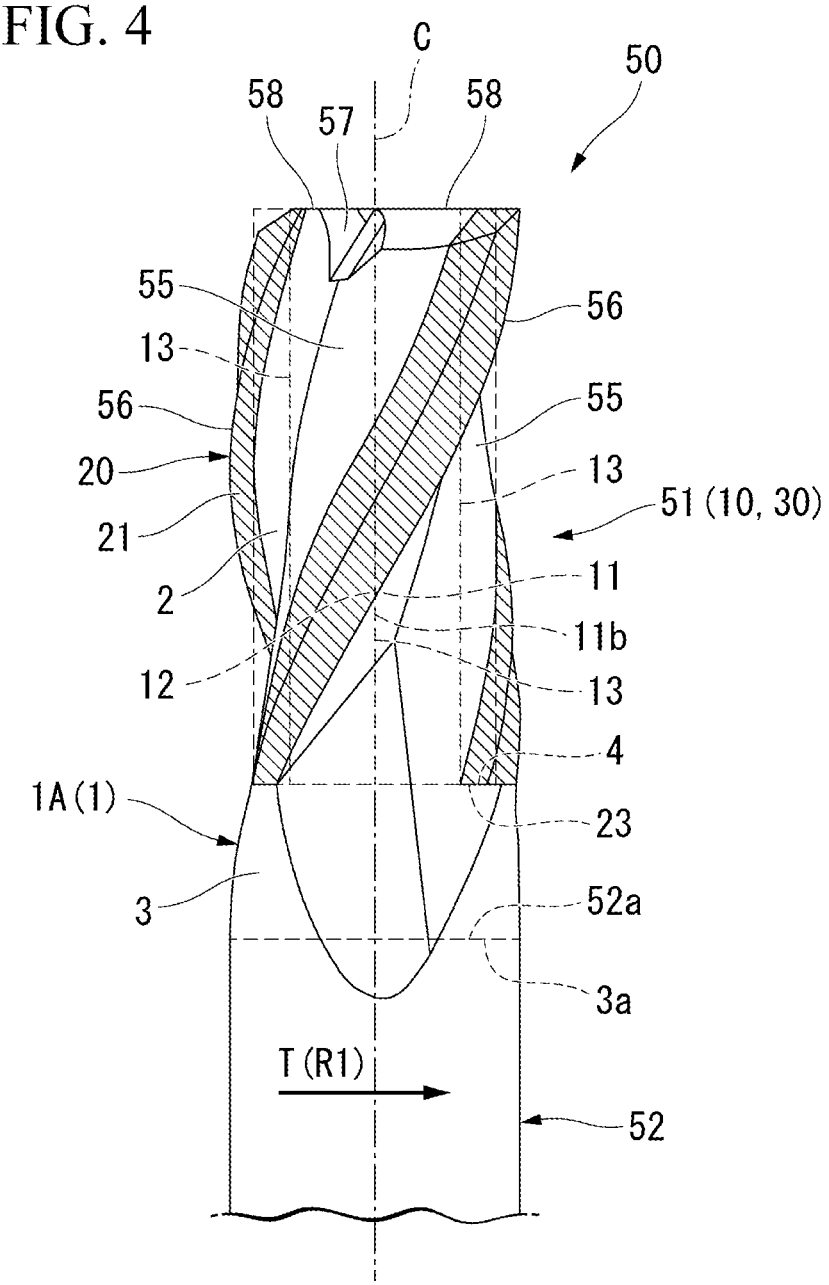
FIG. 4 is a side view showing a cutting tool of the first embodiment.

Hereinafter, a base material 1A(1) for a hard sintered body, a hard sintered body 10, and a cutting tool 50 according to a first embodiment of the present invention will be described with reference to FIGS. 1A to 4. FIGS. 1A and 3 show the hard sintered body 10 of the present embodiment. FIG. 2 shows the base material 1A for the hard sintered body of the present embodiment. FIG. 4 shows the cutting tool 50 of the present embodiment.

In the following description, the base material 1A for the hard sintered body may be simply referred to as a base material 1A in some cases. In addition, the hard sintered body 10 may be paraphrased as an ultra-hard sintered body 10 or an ultra-high hardness sintered body 10.

Figure 1B:
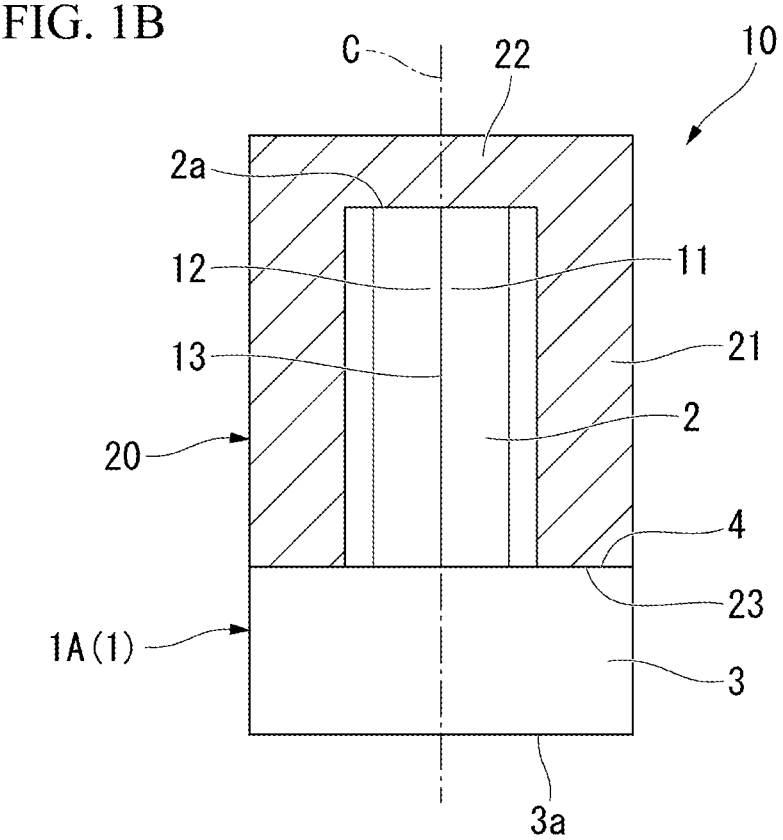
FIG. 1B is a vertical sectional view showing the hard sintered body of the first embodiment (a side view of a base material for the hard sintered body and a vertical sectional view of a cylinder portion).

As shown in FIGS. 1A and 1B, the hard sintered body 10 includes the base material 1A for the hard sintered body and a cylinder portion 20 sintered integrally with the base material 1A for the hard sintered body. The base material 1A has a Young's modulus of 300 GPa or higher. The base material 1A is made of any one of cemented carbide, cermet, and ceramics. The cylinder portion 20 has a Young's modulus of 600 GPa or higher. The cylinder portion 20 is made of any one of polycrystalline diamond (PCD) and polycrystalline cubic boron nitride (PcBN). The cylinder portion 20 has a lower coefficient of linear expansion (coefficient of thermal expansion) and higher hardness than those of the base material 1A.

The hard sintered body 10 is manufactured as follows. A cylindrical capsule (not shown) is filled with a raw material of the base material 1A as a powder compact and a powdery raw material of the cylinder portion 20, and the raw materials are sintered under ultra-high temperature and ultra-high pressure conditions.

As shown in FIGS. 1A to 3, the base material 1A has a multi-stage columnar shape around a central axis C. The base material 1A includes a smaller-diameter portion 2, the larger-diameter portion 3, and a base material end surface 4. The smaller-diameter portion 2 is a "pillar portion" serving as a component of the present invention, and may be referred to as a pillar portion 2 in some cases in the following description. The smaller-diameter portion 2 has the central axis C, and extends in an axial direction of the central axis C. The larger-diameter portion 3 extends in the axial direction of the central axis C around the central axis C.

In the present embodiment, a direction in which the central axis C extends (direction along the central axis C) will be referred to as the axial direction. In the axial direction, the smaller-diameter portion 2 and the larger-diameter portion 3 are disposed at positions different from each other. In the axial direction, a direction from the larger-diameter portion 3 toward the smaller-diameter portion 2 will be referred to as one side in the axial direction, and a direction from the smaller-diameter portion 2 toward the larger-diameter portion 3 will be referred to as the other side in the axial direction.

A direction orthogonal to the central axis C will be referred to as a radial direction. In the radial direction, a direction closer to the central axis C will be referred to as inward in the radial direction, and a direction away from the central axis C will be referred to as outward in the radial direction.

A direction of turning around the central axis C will be referred to as a circumferential direction. In the circumferential direction, a predetermined rotation direction will be referred to as one side R1 in the circumferential direction, and a rotation direction opposite thereto will be referred to as the other side R2 in the circumferential direction.

The central axis C of the base material 1A, the central axis C of the hard sintered body 10, and the central axis C of the cutting tool 50 are common axes, and are disposed coaxially with each other.

One side in the axial direction corresponds to a tip side (upper side in FIG. 4) in the cutting tool 50 shown in FIG. 4. The other side in the axial direction corresponds to a posterior end side (lower side in FIG. 4) in the cutting tool 50.

In the circumferential direction, a direction in which the cutting tool 50 is rotated by a main spindle of a machine tool during a cutting operation may be referred to as a tool rotation direction T, and a rotation direction opposite thereto may be referred to as a direction opposite to the tool rotation direction T (counter-tool rotation direction) in some cases. In the present embodiment, one side R1 in the circumferential direction corresponds to the tool rotation direction T, and the other side R2 in the circumferential direction corresponds to the direction opposite to the tool rotation direction T.

In FIGS. 1 to 3, the smaller-diameter portion (pillar portion) 2 has a columnar shape extending in the axial direction. In the present embodiment, the pillar portion 2 has a polygonal pillar shape. As shown in FIG. 1A, the pillar portion 2 has a polygonal shape in a cross-sectional view perpendicular to the central axis C. In the present embodiment, the pillar portion 2 has a regular polygonal shape, and specifically, has a regular octagonal shape.

The pillar portion 2 has a first outer peripheral portion 11, a second outer peripheral portion 12, and a protruding stripe portion of the base material 13.

The first outer peripheral portion 11 is disposed in an outer peripheral portion of the pillar portion 2, and forms a part of the outer peripheral portion of the pillar portion 2. The first outer peripheral portion 11 forms a portion of an outer peripheral surface of the pillar portion 2 in the circumferential direction. A plurality of the first outer peripheral portions 11 are provided at an interval from each other in the circumferential direction.

In a cross-sectional view shown in FIG. 3, the first outer peripheral portion 11 extends in the circumferential direction or the radial direction. In the present embodiment, each of the first outer peripheral portions 11 extends in the circumferential direction. Specifically, each of the first outer peripheral portions 11 extends from each apex (each protruding stripe portion 13 of the base material) located on a circumscribed circle of the pillar portion 2 toward one side R1 in the circumferential direction. Each apex of the pillar portion 2 is located on the outer peripheral surface of the pillar portion 2. A straight line indicated by a reference numeral B in FIG. 3 is a bisector B of an angle formed between a pair of apexes adjacent to each other in the circumferential direction of the pillar portion 2 and a pair of straight lines connecting the central axis C. The first outer peripheral portion 11 is located between the apex of the pillar portion 2 and the bisector B in the circumferential direction. The first outer peripheral portion 11 extends to the bisector B from the apex of the pillar portion 2 toward one side R1 in the circumferential direction. In a cross-sectional view shown in FIG. 3, the first outer peripheral portion 11 has a linear shape in the present embodiment. The first outer peripheral portion 11 is located on a straight line connecting a pair of apexes adjacent to each other in the circumferential direction of the pillar portion 2.

In the cross-sectional view of FIG. 3, one side portion (first end portion) 11a of the first outer peripheral portion 11 is located inside the other side portion (second end portion) 11b in the radial direction. One side portion 11a of the first outer peripheral portion 11 includes a portion located on the bisector B. The other side portion 11b of the first outer peripheral portion 11 includes a portion located on the apex of the pillar portion 2. The first outer peripheral portion 11 is located inward in the radial direction toward one side R1 in the circumferential direction. That is, the first outer peripheral portion 11 extends inward in the radial direction toward one side R1 in the circumferential direction.

One side portion 11a of the first outer peripheral portion 11 includes an end portion on one side R1 in the first outer peripheral portion 11 in the circumferential direction. The other side portion 11b of the first outer peripheral portion 11 includes an end portion on the other side R2 in the first outer peripheral portion 11 in the circumferential direction. One side portion 11a of the first outer peripheral portion 11 includes an end portion inside in the radial direction in the first outer peripheral portion 11, that is, an inner end portion in the radial direction. The other side portion 11b of the first outer peripheral portion 11 includes an end portion outside in the radial direction in the first outer peripheral portion 11, that is, an outer end portion in the radial direction.

In the cross-sectional view of FIG. 3, a straight line indicated by a reference numeral L1 is a first straight line L1 passing through the outer end portion of the first outer peripheral portion 11 in the radial direction and the central axis C, and extending in the radial direction. The first straight line L1 is also a straight line passing through the apex of the pillar portion 2 (protruding stripe portion 13 of the base material) and the central axis C. The straight line indicated by a reference numeral L2 is a second straight line L2 orthogonal to the first straight line L1, and passing over the outer end portion of the first outer peripheral portion 11 in the radial direction. The second straight line L2 is also a straight line orthogonal to the first straight line L1, and passing over the apex of the pillar portion 2. The second straight line L2 corresponds to a tangent line of the circumscribed circle of the pillar portion 2 which passes through the outer end portion (protruding stripe portion 13 of the base material) of the first outer peripheral portion 11 in the radial direction.

In the present embodiment, in the cross-sectional view of FIG. 3, an angle θ at which the first outer peripheral portion 11 is inclined with respect to the second straight line L2 is 4° or larger. Specifically, in the cross-sectional view, the angle θ is an angle formed between the other side portion 11b of the first outer peripheral portion 11 and the second straight line L2. That is, the angle θ is an angle at which the first outer peripheral portion 11 is inclined in the rotation direction on one side R1 in the circumferential direction from the second straight line L2. In the cross-sectional view, all of the angles θ of the plurality of first outer peripheral portions 11 are equal to each other.

In the present embodiment, the first outer peripheral portion 11 faces the outer side in the radial direction, and specifically, the first outer peripheral portion 11 extends toward one side R1 in the circumferential direction from the outer end portion (protruding stripe portion 13 of the base material) of the first outer peripheral portion 11 in the radial direction. In the cross-sectional view of FIG. 3, the angle θ in this case indicates an acute angle out of an acute angle and an obtuse angle which are formed by intersection between the second straight line L2 and the first outer peripheral portion 11. A more preferable range of the angle θ is 5° or larger and 60° or smaller.

The second outer peripheral portion 12 is disposed in the outer peripheral portion of the pillar portion 2, and forms a part of the outer peripheral portion of the pillar portion 2. The second outer peripheral portion 12 forms a portion of the outer peripheral surface of the pillar portion 2 in the circumferential direction which is different from that of the first outer peripheral portion 11. A plurality of the second outer peripheral portions 12 are provided at an interval from each other in the circumferential direction.

In the cross-sectional view shown in FIG. 3, the second outer peripheral portion 12 extends in the circumferential direction or the radial direction. In the present embodiment, each of the second outer peripheral portions 12 extends in the circumferential direction. Specifically, each of the second outer peripheral portions 12 extends from each apex (each protruding stripe portion 13 of the base material) located on the circumscribed circle of the pillar portion 2 toward the other side R2 in the circumferential direction. The second outer peripheral portion 12 is located between the apex of the pillar portion 2 and the bisector B in the circumferential direction. The second outer peripheral portion 12 extends to the bisector B from the apex of the pillar portion 2 toward the other side R2 in the circumferential direction. In the cross-sectional view shown in FIG. 3, the second outer peripheral portion 12 has a linear shape in the present embodiment. The second outer peripheral portion 12 is located on a straight line connecting a pair of apexes adjacent to each other in the circumferential direction of the pillar portion 2. That is, in the present embodiment, on the straight line connecting the pair of apexes adjacent to each other in the circumferential direction of the pillar portion 2, the first outer peripheral portion 11 and the second outer peripheral portion 12 are disposed adjacent to each other on both sides in the circumferential direction around the bisector B.

In the cross-sectional view of FIG. 3, one side portion (first end portion) 12a of the second outer peripheral portion 12 is located outside the other side portion (second end portion) 12b in the radial direction. One side portion 12a of the second outer peripheral portion 12 includes a portion located on the apex of the pillar portion 2. The other side portion 12b of the second outer peripheral portion 12 includes a portion located on the bisector B. The second outer peripheral portion 12 is located outward in the radial direction toward one side R1 in the circumferential direction. That is, the second outer peripheral portion 12 extends outward in the radial direction toward one side R1 in the circumferential direction.

One side portion 12a of the second outer peripheral portion 12 includes an end portion on one side R1 in the circumferential direction in the second outer peripheral portion 12. The other side portion 12b of the second outer peripheral portion 12 includes an end portion on the other side R2 in the circumferential direction in the second outer peripheral portion 12. One side portion 12a of the second outer peripheral portion 12 includes an end portion outside in the radial direction in the second outer peripheral portion 12, that is, an outer end portion in the radial direction. The other side portion 12b of the second outer peripheral portion 12 includes an end portion inside in the radial direction in the second outer peripheral portion 12, that is, an inner end portion in the radial direction.

In the present embodiment, the pillar portion 2 has a regular polygonal shape in the cross-sectional view perpendicular to the central axis C. Accordingly, the angle at which the second outer peripheral portion 12 is inclined with respect to the second straight line L2 in the cross-sectional view of FIG. 3 has a value the same as that of the angle θ described above. Specifically, in the cross-sectional view, the angle is an angle formed between one side portion 12a of the second outer peripheral portion 12 and the second straight line L2. In the cross-sectional view, all of the angles of the plurality of second outer peripheral portions 12 are equal to each other.

The plurality of first outer peripheral portions 11 and the plurality of second outer peripheral portions 12 are alternately disposed in the circumferential direction. In the cross-sectional view shown in FIG. 3, the first outer peripheral portion 11 and the second outer peripheral portion 12 are connected to each other. The first outer peripheral portion 11 and the second outer peripheral portion 12 are connected to each other in the circumferential direction.

The first outer peripheral portion 11 and the second outer peripheral portion 12 which are adjacent to each other in the circumferential direction are connected to each other on the apex of the pillar portion 2. That is, the other side portion 11b of the first outer peripheral portion 11 and one side portion 12a of the second outer peripheral portion 12 are connected on the apex of the pillar portion 2. The first outer peripheral portion 11 and the second outer peripheral portion 12 which are adjacent to each other in the circumferential direction are connected to each other on the bisector B. That is, one side portion 11a of the first outer peripheral portion 11 and the other side portion 12b of the second outer peripheral portion 12 are connected on the bisector B.

The protruding stripe portion of the base material 13 is located in a connection portion between the first outer peripheral portion 11 and the second outer peripheral portion 12 which are connected to each other in the cross-sectional view shown in FIG. 3, and extends in the axial direction. The protruding stripe portion of the base material 13 is located in a connection portion between the other side portion 11b of the first outer peripheral portion 11 and one side portion 12a of the second outer peripheral portion 12, and protrudes outward in the radial direction. In the present embodiment, the protruding stripe portion of the base material 13 has a sharp angle at an outer end of the protruding stripe portion of the base material 13 in the radial direction.

As shown in FIGS. 1B and 2, in the present embodiment, the protruding stripe portion of the base material 13 extends along the central axis C in the axial direction. A plurality of the protruding stripe portion of the base materials 13 are provided at an interval from each other in the circumferential direction. In the cross-sectional view of FIG. 3, the plurality of protruding stripe portions 13 of the base material are disposed rotationally symmetrically (point symmetrically) around the central axis C. That is, the plurality of the protruding stripe portion of the base materials 13 are disposed at an equal pitch in the circumferential direction.

As shown in FIGS. 1A and 2, the larger-diameter portion 3 has a columnar shape extending in the axial direction. The larger-diameter portion 3 has the outer diameter larger than that of the smaller-diameter portion (pillar portion) 2. For example, the outer diameter (diameter) of the larger-diameter portion 3 is substantially twice the outer diameter of the smaller-diameter portion 2. The larger-diameter portion 3 has an axial length shorter than that of the smaller-diameter portion 2. An end surface 3a of the larger-diameter portion 3 facing the other side in the axial direction has a planar shape spreading in a direction perpendicular to the central axis C. The end surface 3a has a circular shape.

The base material end surface 4 is located between an end portion on one side of the outer peripheral surface of the larger-diameter portion 3 in the axial direction and an end portion on the other side of the smaller-diameter portion 2 in the axial direction, and faces one side in the axial direction. The base material end surface 4 is disposed between an end portion on one side of the outer peripheral surface of the larger-diameter portion 3 in the axial direction and an end portion on the other side of the outer peripheral surface of the smaller-diameter portion 2 in the axial direction. The base material end surface 4 has a circular ring shape around the central axis C. In the present embodiment, the base material end surface 4 has a planar shape spreading in the direction perpendicular to the central axis C.

As shown in FIGS. 1A and 1B, the cylinder portion 20 has a cylindrical shape that covers the smaller-diameter portion (pillar portion) 2 from the outside in the radial direction. The cylinder portion 20 has a cylindrical shape around the central axis C, and extends in the axial direction. In the present embodiment, the cylinder portion 20 has a ridged cylindrical shape. The cylinder portion 20 has a surrounding wall portion 21, a top wall portion 22, and a cylinder portion end surface 23.

The surrounding wall portion 21 has a cylindrical shape extending in the axial direction. The surrounding wall portion 21 surrounds the pillar portion 2 from the outside in the radial direction. In a cross-sectional view shown in FIG. 1A, an inner peripheral surface of the surrounding wall portion 21 has a polygonal shape. In the present embodiment, the inner peripheral surface of the surrounding wall portion 21 has a regular polygonal shape, specifically, a regular octagonal shape. The inner peripheral surface of the surrounding wall portion 21 is fixed to the outer peripheral surface of the pillar portion 2. The inner peripheral surface of the surrounding wall portion 21 (that is, the inner peripheral surface of the cylinder portion 20) is bonded to the outer peripheral surface of the pillar portion 2.

The surrounding wall portion 21 has a first inner peripheral portion 31, a second inner peripheral portion 32, and a recessed stripe portion 33 of the cylinder portion. That is, the cylinder portion 20 has the first inner peripheral portion 31, the second inner peripheral portion 32, and the recessed stripe portion 33 of the cylinder portion.

The first inner peripheral portion 31 is disposed in the inner peripheral portion of the surrounding wall portion 21. That is, the first inner peripheral portion 31 is disposed in the inner peripheral portion of the cylinder portion 20, and forms a part of the inner peripheral portion of the cylinder portion 20. The first inner peripheral portion 31 forms a portion of the inner peripheral surface of the surrounding wall portion 21 (cylinder portion 20) in the circumferential direction. A plurality of the first inner peripheral portions 31 are provided at an interval from each other in the circumferential direction.

In the cross-sectional view shown in FIG. 3, the first inner peripheral portion 31 extends in the circumferential direction or the radial direction. In the present embodiment, each of the first inner peripheral portions 31 extends in the circumferential direction. Specifically, each of the first inner peripheral portions 31 extends from each apex (each of the recessed stripe portions 33 of the cylinder portion 20) located on the inner peripheral surface of the surrounding wall portion 21 toward one side R1 in the circumferential direction. The above-described bisector B also serves as the bisector B of the angle formed between a pair of apexes adjacent to each other in the circumferential direction on the inner peripheral surface of the surrounding wall portion 21 and a pair of straight lines connecting the central axis C. The first inner peripheral portion 31 is located between the apex of the inner peripheral surface of the surrounding wall portion 21 and the bisector B in the circumferential direction. The first inner peripheral portion 31 extends to the bisector B from the apex of the surrounding wall portion 21 toward one side R1 in the circumferential direction. In the cross-sectional view shown in FIG. 3, the first inner peripheral portion 31 has a linear shape in the present embodiment. The first inner peripheral portion 31 is located on the straight line connecting the pair of apexes adjacent to each other in the circumferential direction on the inner peripheral surface of the surrounding wall portion 21.

In the cross-sectional view of FIG. 3, one side portion (first end portion) 31a of the first inner peripheral portion 31 is located inside the other side portion (second end portion) 31b in the radial direction. One side portion 31a of the first inner peripheral portion 31 includes a portion located on the bisector B. The other side portion 31b of the first inner peripheral portion 31 includes a portion located on the apex of the inner peripheral surface of the surrounding wall portion 21. The first inner peripheral portion 31 is located inward in the radial direction toward one side R1 in the circumferential direction. That is, the first inner peripheral portion 31 extends inward in the radial direction toward one side R1 in the circumferential direction.

One side portion 31a of the first inner peripheral portion 31 includes an end portion on one side R1 in the circumferential direction in the first inner peripheral portion 31. The other side portion 31b of the first inner peripheral portion 31 includes an end portion on the other side R2 in the circumferential direction in the first inner peripheral portion 31. One side portion 31a of the first inner peripheral portion 31 includes an end portion inside in the radial direction in the first inner peripheral portion 31, that is, an inner end portion in the radial direction. The other side portion 31b of the first inner peripheral portion 31 includes an end portion outside in the radial direction in the first inner peripheral portion 31, that is, an outer end portion in the radial direction.

The first straight line L1 described above is also a straight line passing through the outer end portion of the first inner peripheral portion 31 in the radial direction and the central axis C, and extending in the radial direction. The first straight line L1 is also a straight line passing through the apex (recessed stripe portion 33 of the cylinder portion) of the inner peripheral surface of the surrounding wall portion 21 and the central axis C. The second straight line L2 described above is also a straight line orthogonal to the first straight line L1, and passing over the outer end portion of the first inner peripheral portion 31 in the radial direction. The second straight line L2 is also a straight line orthogonal to the first straight line L1, and passing over the apex of the inner peripheral surface of the surrounding wall portion 21.

In the present embodiment, in the cross-sectional view of FIG. 3, the angle θ at which the first inner peripheral portion 31 is inclined with respect to the second straight line L2 is 4° or larger. Specifically, in the cross-sectional view, the angle θ is the angle formed between the other side portion 31b of the first inner peripheral portion 31 and the second straight line L2. In the cross-sectional view, all of the angles θ of the plurality of first inner peripheral portions 31 are equal to each other.

Each of the first inner peripheral portions 31 is in contact with each of the first outer peripheral portions 11. The first outer peripheral portion 11 and the first inner peripheral portion 31 are bonded to each other. One side portion 11a of the first outer peripheral portion 11 and one side portion 31a of the first inner peripheral portion 31 are bonded to each other while facing each other in the radial direction. The other side portion 11b of the first outer peripheral portion 11 and the other side portion 31b of the first inner peripheral portion 31 are bonded to each other while facing each other in the radial direction.

The second inner peripheral portion 32 is disposed in the inner peripheral portion of the surrounding wall portion 21. That is, the second inner peripheral portion 32 is disposed in the inner peripheral portion of the cylinder portion 20, and forms a part of the inner peripheral portion of the cylinder portion 20. The second inner peripheral portion 32 forms a portion of the inner peripheral surface of the surrounding wall portion 21 in the circumferential direction, which is different from that of the first inner peripheral portion 31. A plurality of the second inner peripheral portions 32 are provided at an interval from each other in the circumferential direction.

In the cross-sectional view shown in FIG. 3, the second inner peripheral portion 32 extends in the circumferential direction or the radial direction. In the present embodiment, each of the second inner peripheral portions 32 extends in the circumferential direction. Specifically, each of the second inner peripheral portions 32 extends from each apex (each of the recessed stripe portions 33 of the cylinder portion 20) located on the inner peripheral surface of the surrounding wall portion 21 toward the other side R2 in the circumferential direction. The second inner peripheral portion 32 is located between the apex of the inner peripheral surface of the surrounding wall portion 21 and the bisector B in the circumferential direction. The second inner peripheral portion 32 extends to the bisector B from the apex of the surrounding wall portion 21 toward the other side R2 in the circumferential direction. In the cross-sectional view shown in FIG. 3, the second inner peripheral portion 32 has a linear shape in the present embodiment. The second inner peripheral portion 32 is located on the straight line connecting the pair of apexes adjacent to each other in the circumferential direction on the inner peripheral surface of the surrounding wall portion 21. That is, in the present embodiment, the first inner peripheral portion 31 and the second inner peripheral portion 32 are disposed adjacent to each other on both sides in the circumferential direction around the bisector B, on the straight line connecting the pair of apexes adjacent to each other in the circumferential direction of the inner peripheral surface of the surrounding wall portion 21.

In the cross-sectional view of FIG. 3, one side portion (first end portion) 32a of the second inner peripheral portion 32 is located outside the other side portion (second end portion) 32b in the radial direction. One side portion 32a of the second inner peripheral portion 32 includes a portion located on the apex of the inner peripheral surface of the surrounding wall portion 21. The other side portion 32b of the second inner peripheral portion 32 includes a portion located on the bisector B. The second inner peripheral portion 32 is located outward in the radial direction toward one side R1 in the circumferential direction. That is, the second inner peripheral portion 32 extends outward in the radial direction toward one side R1 in the circumferential direction.

One side portion 32a of the second inner peripheral portion 32 includes an end portion on the one side R1 in the circumferential direction in the second inner peripheral portion 32. The other side portion 32b of the second inner peripheral portion 32 includes an end portion on the other side R2 in the circumferential direction in the second inner peripheral portion 32. One side portion 32a of the second inner peripheral portion 32 includes an end portion outside in the radial direction in the second inner peripheral portion 32, that is, an outer end portion in the radial direction. The other side portion 32b of the second inner peripheral portion 32 includes an end portion inside in the radial direction in the second inner peripheral portion 32, that is, an inner end portion in the radial direction.

In the present embodiment, the inner peripheral surface of the surrounding wall portion 21 has a regular polygonal shape in the cross-sectional view perpendicular to the central axis C. Accordingly, in the cross-sectional view of FIG. 3, the angle at which the second inner peripheral portion 32 is inclined with respect to the second straight line L2 has a value the same as that of the above-described angle θ. Specifically, in the cross-sectional view, the angle is an angle formed between one side portion 32a of the second inner peripheral portion 32 and the second straight line L2. In the cross-sectional view, all of the angles of the plurality of second inner peripheral portions 32 are equal to each other.

The plurality of first inner peripheral portions 31 and the plurality of second inner peripheral portions 32 are alternately disposed in the circumferential direction. In the cross-sectional view shown in FIG. 3, the first inner peripheral portion 31 and the second inner peripheral portion 32 are connected to each other. The first inner peripheral portion 31 and the second inner peripheral portion 32 are connected to each other in the circumferential direction.

The first inner peripheral portion 31 and the second inner peripheral portion 32 which are adjacent to each other in the circumferential direction are connected to each other on the apex of the inner peripheral surface of the surrounding wall portion 21. That is, the other side portion 31b of the first inner peripheral portion 31 and one side portion 32a of the second inner peripheral portion 32 are connected on the apex of the surrounding wall portion 21. The first inner peripheral portion 31 and the second inner peripheral portion 32 which are adjacent to each other in the circumferential direction are connected to each other on the bisector B. That is, one side portion 31a of the first inner peripheral portion 31 and the other side portion 32b of the second inner peripheral portion 32 are connected on the bisector B.

Each of the second inner peripheral portions 32 is in contact with each of the second outer peripheral portions 12. The second outer peripheral portion 12 and the second inner peripheral portion 32 are bonded to each other. One side portion 12a of the second outer peripheral portion 12 and one side portion 32a of the second inner peripheral portion 32 are bonded to each other while facing each other in the radial direction. The other side portion 12b of the second outer peripheral portion 12 and the other side portion 32b of the second inner peripheral portion 32 are bonded to each other while facing each other in the radial direction.

The recessed stripe portion 33 of the cylinder portion is located in a connection portion between the first inner peripheral portion 31 and the second inner peripheral portion 32 which are connected to each other in the cross-sectional view shown in FIG. 3, and extends in the axial direction. The recessed stripe portion 33 of the cylinder portion is located in a connection portion between the other side portion 31b of the first inner peripheral portion 31 and one side portion 32a of the second inner peripheral portion 32, and is recessed outward in the radial direction.

In the present embodiment, the recessed stripe portion 33 of the cylinder portion extends along the central axis C in the axial direction. A plurality of the recessed stripe portions 33 of the cylinder portion are provided at an interval from each other in the circumferential direction. In the cross-sectional view of FIG. 3, the plurality of recessed stripe portions 33 of the cylinder portion are disposed rotationally symmetrically around the central axis C. That is, the plurality of recessed stripe portions 33 of the cylinder portion are disposed at an equal pitch in the circumferential direction.

Each of the recessed stripe portions 33 of the cylinder portion is in contact with each of the protruding stripe portion of the base materials 13. The protruding stripe portion of the base material 13 and the recessed stripe portion 33 of the cylinder portion are bonded to each other.

As shown in FIG. 1B, the top wall portion 22 is connected to the end portion on one side of the surrounding wall portion 21 in the axial direction. The top wall portion 22 has a disk shape around the central axis C. A pair of plate surfaces of the top wall portion 22 face the axial direction. The plate surface of the top wall portion 22 which faces the other side in the axial direction is fixed to an end surface 2a of the pillar portion 2 which faces one side in the axial direction. The end surface 2a of the pillar portion 2 which faces one side in the axial direction has a planar shape perpendicular to the central axis C. The end surface 2a of the pillar portion 2 which faces one side in the axial direction has a polygonal shape. The plate surface of the top wall portion 22 which faces the other side in the axial direction is bonded to the end surface 2a of the pillar portion 2 which faces one side in the axial direction.

The cylinder portion end surface 23 is located in an end portion on the other side of the surrounding wall portion 21 in the axial direction, and faces the other side in the axial direction. The cylinder portion end surface 23 has a circular ring shape around the central axis C. In the present embodiment, the cylinder portion end surface 23 has a planar shape spreading in the direction perpendicular to the central axis C. The cylinder portion end surface 23 is fixed to the base material end surface 4. The cylinder portion end surface 23 is bonded to the base material end surface 4.

The cutting tool 50 is a rotary cutting tool (milling tool), and specifically, is an end mill, a reamer, or a drill. As shown in FIG. 4, the cutting tool 50 of the present embodiment is the end mill.

In the outer peripheral portion of the above-described hard sintered body 10, the cutting tool 50 includes a cutting portion 51 provided with a chip discharge groove 55 and a cutting edge (peripheral cutting edge) 56 which extend in the axial direction, and a shank 52 connected to the cutting portion 51 in the axial direction. That is, the cutting portion 51 is manufactured as follows. The chip discharge groove 55 and the cutting edge 56 are subjected to a grinding operation in the outer peripheral portion of the hard sintered body 10 by a grinding wheel. That is, the hard sintered body 10 is a material for manufacturing the cutting portion 51, and is an intermediate body of the cutting portion 51 manufactured in a manufacturing process of the cutting tool 50. The outer peripheral surface of the cutting portion 51 is disposed in the surrounding wall portion 21 of the cylinder portion 20.

The shank 52 is made of cemented carbide. The shank 52 has a columnar shape extending in the axial direction. For example, the cutting portion 51 and the shank 52 are bonded to each other by brazing through induction heating under vacuum using Ag wax. That is, an end surface (end surface of the larger-diameter portion 3) 3a facing the other side of the cutting portion 51 in the axial direction and an end surface 52a facing one side of the shank 52 in the axial direction are bonded to each other by the brazing.

The shank 52 is detachably attached to a main spindle of a machine tool (not shown). The cutting tool 50 is rotated around the central axis C by the main spindle of the machine tool to perform a cutting operation (rotating cutting process) on a dry high-speed slot milling. For example, as the dry high-speed slot milling, the cutting tool 50 of the present embodiment is suitable for cutting a difficult-to-cut material such as a titanium alloy, an aluminum alloy, carbon fiber reinforced plastic (CFRP), and a carbon fiber reinforced carbon composite material called C-C composite which are non-iron materials.

The chip discharge groove 55 is recessed inward in the radial direction from the outer peripheral surface of the cutting tool 50, and extends in the axial direction. In the present embodiment, the chip discharge groove 55 extends in a helical shape in a direction opposite to the tool rotation direction T from an end portion (tip portion) on one side of the cutting tool 50 in the axial direction toward the other side (posterior end side) in the axial direction.

One or more chip discharge grooves 55 are provided in the cutting tool 50. In the present embodiment, a plurality of the chip discharge grooves 55 are provided. The plurality of chip discharge grooves 55 are disposed at an interval from each other in the circumferential direction. In the present embodiment, the plurality of chip discharge grooves 55 are disposed on the outer circumference of the cutting tool 50 at an equal interval (at an equal pitch) from each other in the circumferential direction to be located at rotationally symmetrical positions around the central axis C. The plurality of chip discharge grooves 55 may be disposed at unequal intervals (at unequal pitches) from each other in the circumferential direction.

The cutting edge 56 is disposed in the cutting portion 51, and extends in the axial direction. The cutting edge 56 is formed in an intersecting ridge of the wall surface of the chip discharge groove 55 which faces the tool rotation direction T and the outer peripheral surface of the cutting portion 51. The cutting edge 56 extends in a helical shape in the direction opposite to the tool rotation direction T from the end portion (tip portion) on one side of the cutting portion 51 in the axial direction toward the other side in the axial direction.

One or more cutting edges 56 are provided. The number of the cutting edges 56 is the same as the number of the chip discharge grooves 55. In the present embodiment, a plurality of the cutting edges 56 are provided. Each of the cutting edges 56 extends along each of the chip discharge grooves 55. In the present embodiment, the plurality of cutting edges 56 are disposed on the outer circumference of the cutting portion 51 at an equal interval (at an equal pitch) from each other in the circumferential direction to be located at rotationally symmetrical positions around the central axis C. The plurality of cutting edges 56 may be disposed at unequal intervals (at unequal pitches) from each other in the circumferential direction.

The cutting edge 56 is disposed in the surrounding wall portion 21 of the cylinder portion 20 of the hard sintered body 10, and forms a part of the outer peripheral portion of the cutting portion 51.

The chip discharge groove 55 is disposed over the surrounding wall portion 21 and the pillar portion 2 of the cylinder portion 20. On the wall surface of the chip discharge groove 55 which faces the tool rotation direction T, the outer peripheral portion adjacent to the cutting edge 56, that is, a rake face of the cutting edge 56 is disposed in the surrounding wall portion 21 of the cylinder portion 20.

On the outer peripheral surface of the cutting portion 51, a portion adjacent to the cutting edge 56, that is, a flank face of the cutting edge 56 is disposed in the surrounding wall portion 21 of the cylinder portion 20.

As shown in FIG. 4, when viewed in the radial direction, the other side portion 11b of the first outer peripheral portion 11 of the base material 1A and the cutting edge 56 intersect with each other. When viewed in the radial direction, the protruding stripe portion of the base material 13 and the cutting edge 56 intersect with each other. In the present embodiment, the number of the first outer peripheral portions 11 is equal to or more than the number of the cutting edges 56. The number of the protruding stripe portion of the base materials 13 is equal to or more than the number of the cutting edges 56.

The cutting portion 51 of the present embodiment has a gash 57 and an end cutting edge 58, in addition to the chip discharge groove 55 and the cutting edge 56. The gash 57 is located in an end portion on one side of the chip discharge groove 55 in the axial direction. The gash 57 has a groove shape extending in the radial direction. The gash 57 is provided in each of the plurality of chip discharge grooves 55.

The end cutting edge 58 is disposed in an end portion on one side of the cutting portion 51 in the axial direction, and extends in the radial direction. A plurality of the end cutting edges 58 are provided at an interval from each other in the circumferential direction. The end cutting edge 58 may be disposed in the top wall portion 22 of the cylinder portion 20.

The base material 1A for the hard sintered body of the present embodiment described above has the protruding stripe portion of the base material 13 protruding outward in the radial direction. In addition, the cylinder portion 20 sintered integrally with the base material 1A is provided with a portion (recessed stripe portion 33 of the cylinder portion) bonded to the protruding stripe portion of the base material 13. Therefore, when the hard sintered body 10 in which the base material 1A and the cylinder portion 20 are sintered is subjected to a cutting operation by using the cutting portion 51 of the cutting tool 50, a load applied to the cutting tool 50 in the circumferential direction can be received at the protruding stripe portion of the base material 13. In this manner, out of the loads applied to the cutting tool 50 during the cutting operation, it is possible to prevent a possibility that the load applied in the direction perpendicular to the central axis C of the tool may act along the interface between the base material 1A and the cylinder portion 20. That is, a shearing force along the interface can be reduced, and it is possible to prevent occurrence of cracks or chips near the interface between the base material 1A and the cylinder portion 20. Therefore, the fracturing resistance of the cutting tool 50 manufactured by using the hard sintered body 10 can be improved, and the tool life can be extended.

In addition, in the present embodiment, the protruding stripe portion of the base material 13 has the sharp angle at the outer end in the radial direction. Accordingly, the function (action) of the protruding stripe portion of the base material 13 described above is further improved.

In addition, in the present embodiment, the plurality of protruding stripe portions 13 of the base material are provided at an interval from each other in the circumferential direction.

In this case, when the hard sintered body 10 in which the base material 1A and the cylinder portion 20 are sintered is subjected to a cutting operation by using the cutting portion 51 of the cutting tool 50, the above-described function of the protruding stripe portion of the base materials 13 can be obtained at a plurality of locations in the circumferential direction of the cutting tool 50. Therefore, it is possible to stably prevent the occurrence of cracks or chips near the interface between the base material 1A and the cylinder portion 20, and it is possible to further improve the fracturing resistance of the cutting tool 50.

In addition, in the present embodiment, in the cross-sectional view perpendicular to the central axis C, the plurality of protruding stripe portions 13 of the base material are disposed rotationally symmetrically around the central axis C.

In this case, when the hard sintered body 10 in which the base material 1A and the cylinder portion 20 are sintered is subjected to a cutting operation by using the cutting portion 51 of the cutting tool 50, the load is evenly applied to each of the protruding stripe portion of the base materials 13. That is, it is possible to prevent a possibility that a heavy load may continuously act on the specific protruding stripe portion 13 of the base material, and it is possible to more stably prevent the occurrence of cracks and chips near the interface between the base material 1A and the cylinder portion 20.

In addition, in the present embodiment, in a cross-sectional view perpendicular to the central axis C, the pillar portion 2 has a polygonal shape.

In this case, a configuration of the present embodiment can be easily realized, and can be easily manufactured.

In addition, in the hard sintered body 10 and the cutting tool 50 of the present embodiment, in the cross-sectional view perpendicular to the central axis C, one side portion 11a of the first outer peripheral portion 11 of the base material 1A is located inside the other side portion 11b in the radial direction. That is, the first outer peripheral portion 11 faces the circumferential direction (one side R1 in the circumferential direction). In addition, in the cross-sectional view, one side portion 31a of the first inner peripheral portion 31 of the cylinder portion 20 is located inside the other side portion 31b in the radial direction. That is, the first inner peripheral portion 31 faces the circumferential direction (the other side R2 in the circumferential direction). Then, the first outer peripheral portion 11 and the first inner peripheral portion 31 which face the circumferential direction are bonded to each other.

When the hard sintered body 10 is subjected to a cutting operation by using the cutting portion 51 of the cutting tool 50, the first outer peripheral portion 11 adopts a posture facing the tool rotation direction T. In this manner, the load applied to the cutting tool 50 in the circumferential direction can be received by the first outer peripheral portion 11 of the base material 1A. In this manner, out of the loads applied to the cutting tool 50 during the cutting operation, it is possible to prevent a possibility that the load applied in the direction perpendicular to the central axis C of the tool may act along the interface between the base material 1A and the cylinder portion 20. That is, a shearing force along the interface can be reduced, and it is possible to prevent occurrence of cracks or chips near the interface between the base material 1A and the cylinder portion 20. Therefore, fracturing resistance of the cutting tool 50 manufactured by using the hard sintered body 10 can be improved, and the tool life can be extended.

In addition, in the present embodiment, the first outer peripheral portion 11 is located inward in the radial direction toward one side R1 in the circumferential direction, and the first inner peripheral portion 31 is located inward in the radial direction toward one side R1 in the circumferential direction. In this case, the first outer peripheral portion 11 of the base material 1A faces one side R1 in the circumferential direction. When the hard sintered body 10 is subjected to a cutting operation by using the cutting portion 51 of the cutting tool 50, one side R1 in the circumferential direction is set as the tool rotation direction T. In this manner, the load applied to the cutting tool 50 in the circumferential direction can be received by the first outer peripheral portion 11 of the base material 1A. In this manner, out of the loads applied to the cutting tool 50 during the cutting operation, it is possible to prevent a possibility that the load applied in the direction perpendicular to the central axis C of the tool may act along the interface between the base material 1A and the cylinder portion 20, and it is possible to prevent the occurrence of cracks or chips near the interface between the base material 1A and the cylinder portion 20.

In addition, in the hard sintered body 10 of the present embodiment, the base material 1A has the protruding stripe portion of the base material 13 protruding outward in the radial direction, and the recessed stripe portion 33 of the cylinder portion 20 is bonded to the protruding stripe portion of the base material 13. Therefore, when the hard sintered body 10 is subjected to a cutting operation by using the cutting portion 51 of the cutting tool 50, the load applied to the cutting tool 50 in the circumferential direction can be received by the protruding stripe portion of the base material 13. In this manner, out of the loads applied to the cutting tool 50 during the cutting operation, it is possible to prevent a possibility that the load applied in the direction perpendicular to the central axis C of the tool may act along the interface between the base material 1A and the cylinder portion 20, and it is possible to prevent the occurrence of cracks or chips near the interface between the base material 1A and the cylinder portion 20.

In addition, in the present embodiment, in the cross-sectional view perpendicular to the central axis C, the angle θ at which the first outer peripheral portion 11 is inclined with respect to the second straight line L2 (tangent line of the circumscribed circle of the pillar portion 2) passing over the outer end portion (protruding stripe portion 13 of the base material) of the first outer peripheral portion 11 in the radial direction is 4° or larger.

In a case where the angle θ at which the first outer peripheral portion 11 is inclined with respect to the second straight line L2 in the cross-sectional view perpendicular to the central axis C is 4° or larger, when the hard sintered body 10 in which the base material 1A and the cylinder portion 20 are sintered is subjected to a cutting operation using the cutting portion 51 of the cutting tool 50, the first outer peripheral portion 11 adopts a posture facing the tool rotation direction T. In this manner, the load applied to the cutting tool 50 in the circumferential direction can be stably received by the first outer peripheral portion 11 of the base material 1A. In this manner, out of the loads applied to the cutting tool 50 during the cutting operation, it is possible to prevent a possibility that the load applied in the direction perpendicular to the central axis C of the tool may act along the interface between the base material 1A and the cylinder portion 20, and it is possible to prevent the occurrence of cracks or chips near the interface between the base material 1A and the cylinder portion 20. It is desirable that the angle θ is 5° or larger in order for the first outer peripheral portion 11 to more stably receive the load applied to the cutting tool 50 in the circumferential direction.

In addition, as in the present embodiment, in a case where the plurality of first outer peripheral portions 11 are provided at an interval from each other in the circumferential direction, when the angle θ at which the first outer peripheral portion 11 is inclined with respect to the second straight line L2 in the cross-sectional view perpendicular to the central axis C is 60° or smaller, the wall thickness near the first outer peripheral portion 11 of the base material 1A is secured, and rigidity of the base material 1A is secured.

In addition, in the present embodiment, all of the angles θ of the plurality of first outer peripheral portions 11 are equal to each other in the cross-sectional view perpendicular to the central axis C.

In this case, when the hard sintered body 10 in which the base material 1A and the cylinder portion 20 are sintered is subjected to a cutting operation by using the cutting portion 51 of the cutting tool 50, the above-described function of the first outer peripheral portion 11 is obtained at a plurality of locations in the circumferential direction of the cutting tool 50, and the load evenly acts on each of the first outer peripheral portions 11. That is, it is possible to prevent a possibility that a heavy load may continuously act on the specific first outer peripheral portion 11, and it is possible to more stably prevent the occurrence of cracks or chips near the interface between the base material 1A and the cylinder portion 20.

In addition, in the present embodiment, the Young's modulus of the base material 1A for the hard sintered body is 300 GPa or higher, and the Young's modulus of the sintered cylinder portion 20 is 600 GPa or higher.

When the Young's modulus of the base material 1A for the hard sintered body is 300 GPa or higher, the rigidity can be stably secured in a case where the base material 1A is used for the cutting tool 50 such as the end mill as in the present embodiment.

In addition, when the Young's modulus of the cylinder portion 20 is 600 GPa or higher, the wear resistance can be stably secured in a case where the cylinder portion 20 is used for the cutting tool 50 such as the end mill as in the present embodiment.

In addition, in the cutting tool 50 of the present embodiment, when viewed in the radial direction, the other side portion 11b (protruding stripe portion 13 of the base material) of the first outer peripheral portion 11 and the cutting edge 56 intersect with each other.

In this case, when the cutting operation is performed by the cutting tool 50, the load applied to the cutting edge 56 in the circumferential direction can be more easily received by the first outer peripheral portion 11 of the base material 1A. Therefore, it is possible to prevent the occurrence of cracks or chips near the interface between the base material 1A and the cylinder portion 20. The fracturing resistance of the cutting tool 50 can be improved, and the tool life can be extended.

In addition, in the present embodiment, the number of the first outer peripheral portions 11 is equal to or larger than the number of the cutting edges 56.

In this case, when viewed in the radial direction, the first outer peripheral portion 11 is likely to be disposed by intersecting with the cutting edge 56. When the cutting operation is performed by the cutting tool 50, the load applied to each of the cutting edges 56 in the circumferential direction can be stably and easily received by each of first outer peripheral portions 11 of the base material 1A. Therefore, it is possible to prevent the occurrence of cracks or chips near the interface between the base material 1A and the cylinder portion 20. The fracturing resistance of the cutting tool 50 can be improved, and the tool life can be extended.

Figure 5:
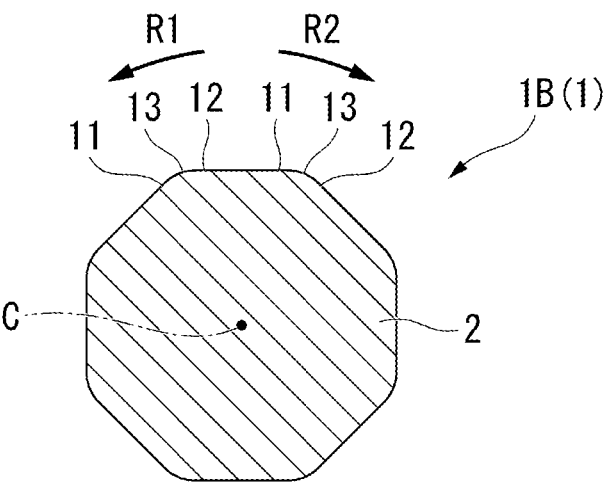
FIG. 5 is a cross-sectional view showing a first modification example of the base material for the hard sintered body of the first embodiment.

FIG. 5 shows a base material 1B(1) for a hard sintered body according to a first modification example of the present embodiment. In the first modification example, the protruding stripe portion of the base material 13 has a convex curve shape in the cross-sectional view perpendicular to the central axis C shown in FIG. 5. That is, in the cross-sectional view, the protruding stripe portion of the base material 13 has the convex curve shape protruding outward in the radial direction. In the cross-sectional view, an end portion on the other side R2 in the circumferential direction of the other side portion 11b of the first outer peripheral portion 11 has the convex curve shape, and an end portion on one side R1 in the circumferential direction of one side portion 12a of the second outer peripheral portion 12 has the convex curve shape.

Figure 6:
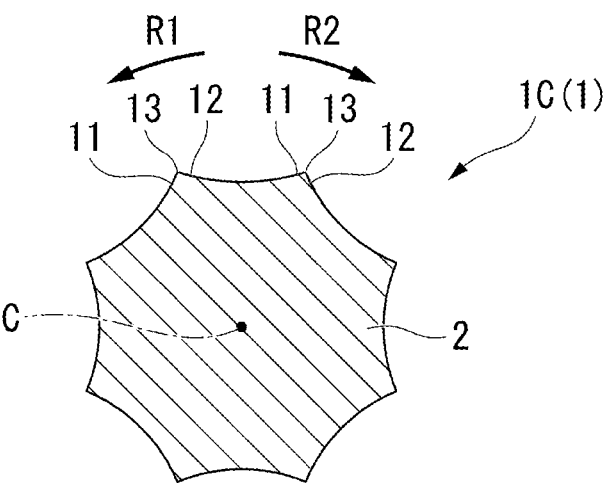
FIG. 6 is a cross-sectional view showing a second modification example of the base material for the hard sintered body of the first embodiment.

FIG. 6 shows a base material 1C(1) for a hard sintered body according to a second modification example of the present embodiment. In the second modification example, the first outer peripheral portion 11 has a concave curve shape, and the second outer peripheral portion 12 has a concave curve shape in the cross-sectional view perpendicular to the central axis C shown in FIG. 6. That is, in the cross-sectional view, the first outer peripheral portion 11 has the concave curve shape recessed inward in the radial direction, and the second outer peripheral portion 12 has the concave curve shape recessed inward in the radial direction. The first outer peripheral portion 11 and the second outer peripheral portion 12 are located on one concave curve passing through the pair of apexes (protruding stripe portions 13 of the base material) adjacent to each other in the circumferential direction of the pillar portion 2, and are disposed adjacent to each other in the circumferential direction.

In the first outer peripheral portion 11, the amount of displacement in the radial direction per unit length in the circumferential direction (that is, inclination with respect to the circumferential direction) increases toward the other side R2 in the circumferential direction. That is, the amount of displacement in the radial direction per unit length in the circumferential direction in the other side portion 11b including the end portion on the other side R2 in the circumferential direction of the first outer peripheral portion 11 is larger than the amount of displacement in the radial direction per unit length in the circumferential direction in one side portion 11a including the end portion on one side R1 in the circumferential directions of the first outer peripheral portion 11.

The amount of displacement in the radial direction per unit length in the circumferential direction of the second outer peripheral portion 12 increases toward one side R1 in the circumferential direction. That is, the amount of displacement in the radial direction per unit length in the circumferential direction in one side portion 12a including the end portion on one side R1 in the circumferential direction of the second outer peripheral portion 12 is larger than the amount of displacement in the radial direction per unit length in the circumferential direction in the other side portion 12b including the end portion of the other side R2 in the circumferential direction of the second outer peripheral portion 12.

Figure 7:
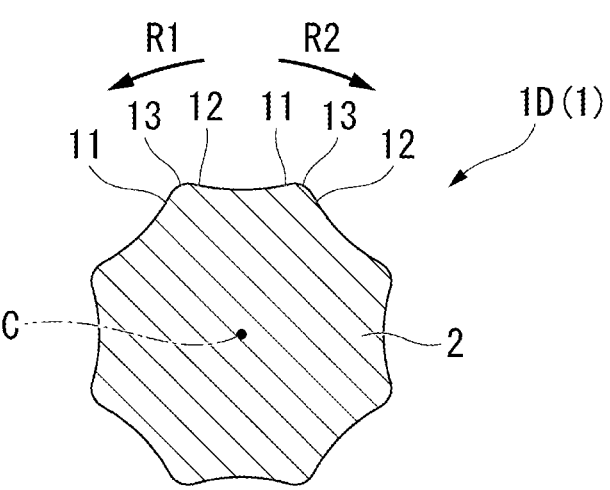
FIG. 7 is a cross-sectional view showing a third modification example of the base material for the hard sintered body of the first embodiment.

FIG. 7 shows a base material 1D(1) for a hard sintered body according to a third modification example of the present embodiment. In the third modification example, the first outer peripheral portion 11 has a concave curve shape, and the second outer peripheral portion 12 has a concave curve shape in the cross-sectional view perpendicular to the central axis C shown in FIG. 7. In addition, in the cross-sectional view, the protruding stripe portion of the base material 13 has a convex curve shape.

In the base material 1B of FIG. 5 and the base material 1D of FIG. 7, the protruding stripe portion of the base material 13 has the convex curve shape in the cross-sectional view perpendicular to the central axis C.

In this case, when the hard sintered body 10 in which the base material 1 and the cylinder portion 20 are sintered is subjected to a cutting operation by using the cutting portion 51 of the cutting tool 50, it is possible to prevent a possibility that a load may be concentrated on the tip (outer end in the radial direction) in the protruding stripe portion of the base material 13. Therefore, it is possible to easily prevent the occurrence of cracks or chips near the protruding stripe portion of the base material 13.

In the base material 1C of FIG. 6 and the base material 1D of FIG. 7, the amount of displacement in the radial direction per unit length in the circumferential direction of the first outer peripheral portion 11 increases toward the other side R2 in the circumferential direction.

In this case, the other side portion 11b including the end portion of the other side R2 in the circumferential direction of the first outer peripheral portion 11 easily faces one side R1 in the circumferential direction. Therefore, when the hard sintered body 10 in which the base material 1 and the cylinder portion 20 are sintered is subjected to a cutting operation by using the cutting portion 51 of the cutting tool 50, a load can be easily received in the other side portion 11b of the first outer peripheral portion 11. Therefore, it is possible to stably prevent the occurrence of cracks or chips near the interface between the base material 1 and the cylinder portion 20, and it is possible to further improve the fracturing resistance of the cutting tool 50.

Figure 8:
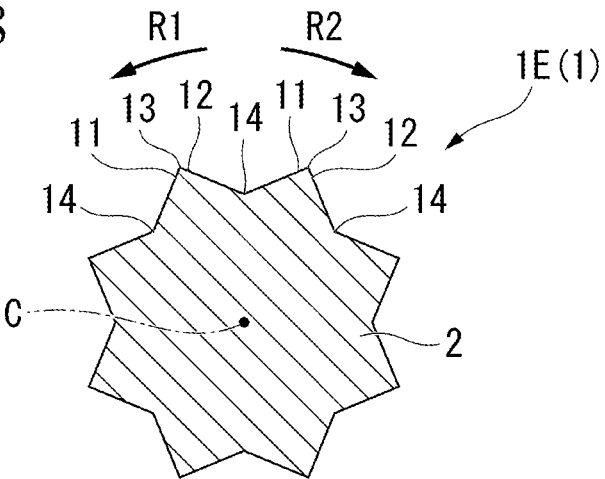
FIG. 8 is a cross-sectional view showing a fourth modification example of the base material for the hard sintered body of the first embodiment.
Figure 9:
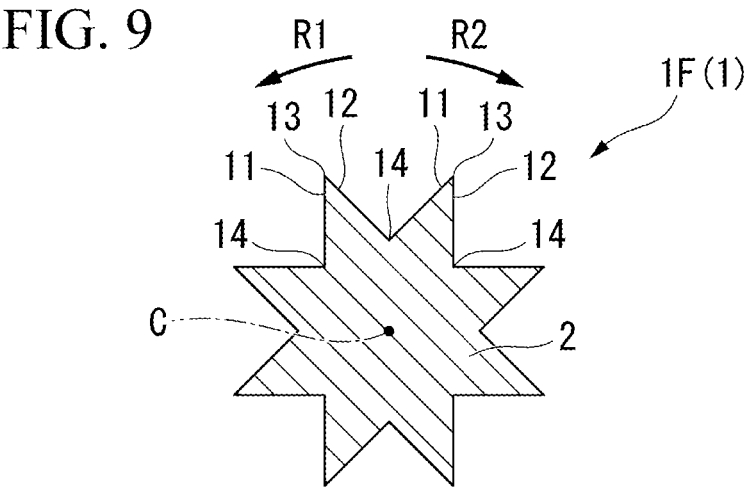
FIG. 9 is a cross-sectional view showing a fifth modification example of the base material for the hard sintered body of the first embodiment.
Figure 10:
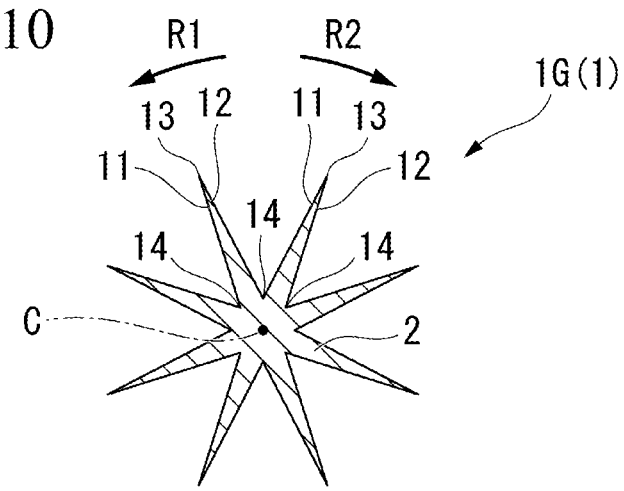
FIG. 10 is a cross-sectional view showing a sixth modification example of the base material for the hard sintered body of the first embodiment.

FIG. 8 shows a base material 1E(1) for a hard sintered body according to a fourth modification example of the present embodiment. FIG. 9 shows a base material 1F(1) for a hard sintered body according to a fifth modification example of the present embodiment. FIG. 10 shows a base material 1G(1) for a hard sintered body according to a sixth modification example of the present embodiment.

In the fourth to sixth modification examples, the pillar portion 2 has the base material recessed stripe portion 14. The base material recessed stripe portion 14 is located in a connection portion between the first outer peripheral portion 11 and the second outer peripheral portion 12 which are connected to each other in the cross-sectional view perpendicular to the central axis C shown in FIGS. 8 to 10, and extends in the axial direction. The base material recessed stripe portion 14 is located in a connection portion between one side portion 11a of the first outer peripheral portion 11 and the other side portion 12b of the second outer peripheral portion 12, and is recessed inward in the radial direction. Although not particularly shown, the base material recessed stripe portion 14 extends along the central axis C in the axial direction.

A plurality of the base material recessed stripe portions 14 are provided at an interval from each other in the circumferential direction. The number of the base material recessed stripe portions 14 is the same as the number of the protruding stripe portion of the base materials 13, and specifically, the number is eight. In each cross-sectional view of FIGS. 8 to 10, the plurality of base material recessed stripe portions 14 are disposed rotationally symmetrically around the central axis C. That is, the plurality of base material recessed stripe portions 14 are disposed at an equal pitch in the circumferential direction. The base material recessed stripe portion 14 is located on the bisector B (refer to FIG. 3).

Figure 21:
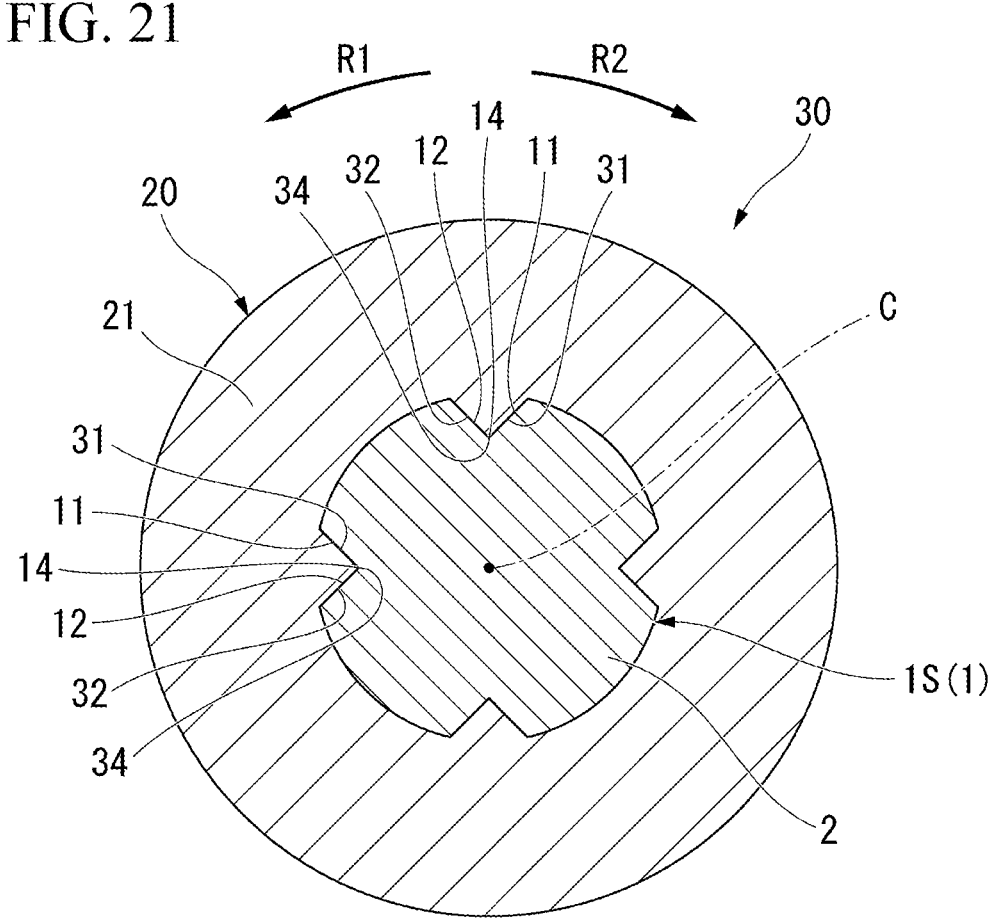
FIG. 21 is a cross-sectional view showing a first modification example of the hard sintered body of the second embodiment.

Although not particularly shown, each of the cylinder portions 20 sintered integrally with the base materials 1E, 1F, and 1G has a cylinder portion protruding stripe portion (refer to a cylinder portion protruding stripe portion 34 shown in FIG. 21). The cylinder portion protruding stripe portion is located in a connection portion between the first inner peripheral portion 31 and the second inner peripheral portion 32 which are connected to each other in the cross-sectional view perpendicular to the central axis C, and extends in the axial direction. The cylinder portion protruding stripe portion is located in a connection portion between one side portion 31a of the first inner peripheral portion 31 and the other side portion 32b of the second inner peripheral portion 32, and protrudes inward in the radial direction. The cylinder portion protruding stripe portion extends along the central axis C in the axial direction.

A plurality of the cylinder portion protruding stripe portions are provided at an interval from each other in the circumferential direction. The plurality of cylinder portion protruding stripe portions are disposed rotationally symmetrically around the central axis C. That is, the plurality of cylinder portion protruding stripe portions are disposed at an equal pitch in the circumferential direction. The cylinder portion protruding stripe portion is located on the bisector B.

The cylinder portion protruding stripe portion is in contact with the base material recessed stripe portion 14. The base material recessed stripe portion 14 and the cylinder portion protruding stripe portion are bonded to each other.

According to the base materials 1E, 1F, and 1G of FIGS. 8 to 10, since the base material recessed stripe portion 14 is provided, the first outer peripheral portion 11 can easily face the circumferential direction. Therefore, when the hard sintered body 10 in which the base material 1 and the cylinder portion 20 are sintered is subjected to a cutting operation by using the cutting portion 51 of the cutting tool 50, the load can be more easily received in the first outer peripheral portion 11. In addition, in the base material 1, the protruding stripe portion of the base material 13 or the first outer peripheral portion 11 can be more freely disposed, and it is possible to easily cope with various types of the hard sintered bodies 10 used in various types of the cutting tools 50.

Figure 11:
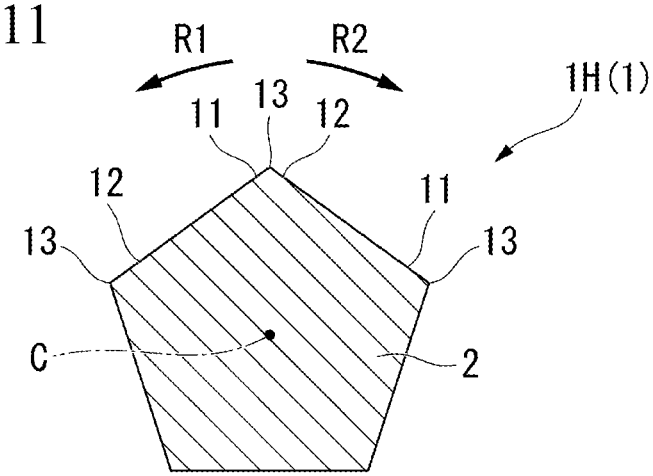
FIG. 11 is a cross-sectional view showing a seventh modification example of the base material for the hard sintered body of the first embodiment.

FIG. 11 shows a base material 1H(1) for a hard sintered body according to a seventh modification example of the present embodiment. In the modification example, the pillar portion 2 has a pentagonal shape, specifically, a regular pentagonal shape in the cross-sectional view perpendicular to the central axis C shown in FIG. 11. That is, the number of apexes of the pillar portion 2 (protruding stripe portion 13 of the base material) is smaller than eight. In this case, for example, compared to a case where the pillar portion 2 has an octagonal shape in the cross-sectional view perpendicular to the central axis C, each of the first outer peripheral portions 11 can more easily face the circumferential direction.

Figure 12:
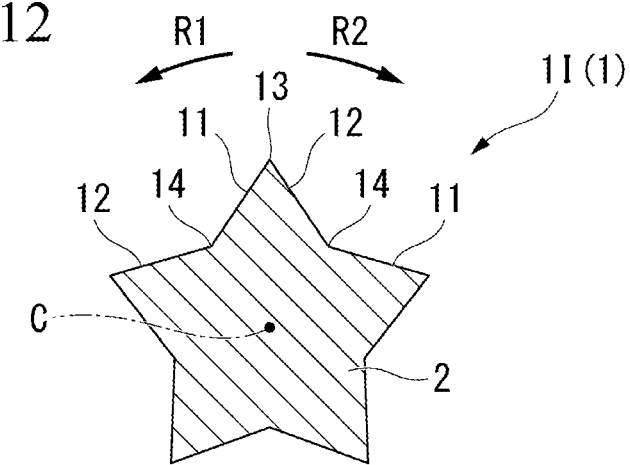
FIG. 12 is a cross-sectional view showing an eighth modification example of the base material for the hard sintered body of the first embodiment.
Figure 13:
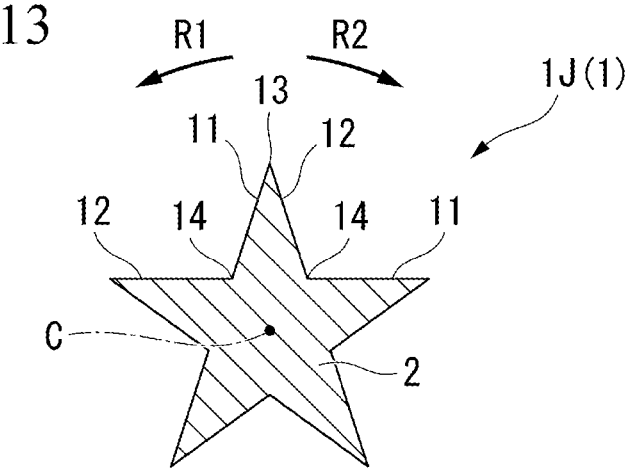
FIG. 13 is a cross-sectional view showing a ninth modification example of the base material for the hard sintered body of the first embodiment.

FIG. 12 shows a base material 1I(1) for a hard sintered body according to an eighth modification example of the present embodiment. FIG. 13 shows a base material 1J(1) for a hard sintered body according to a ninth modification example of the present embodiment.

In the eighth modification example and the ninth modification example, the pillar portion 2 has the base material recessed stripe portion 14, and the number of the base material recessed stripe portions 14 is smaller than eight.

In this case, the protruding stripe portion of the base material 13 or the first outer peripheral portion 11 can be more freely disposed, and it is possible to correspond to various types of the hard sintered bodies 10 used in various types of the cutting tools 50.

Figure 14:
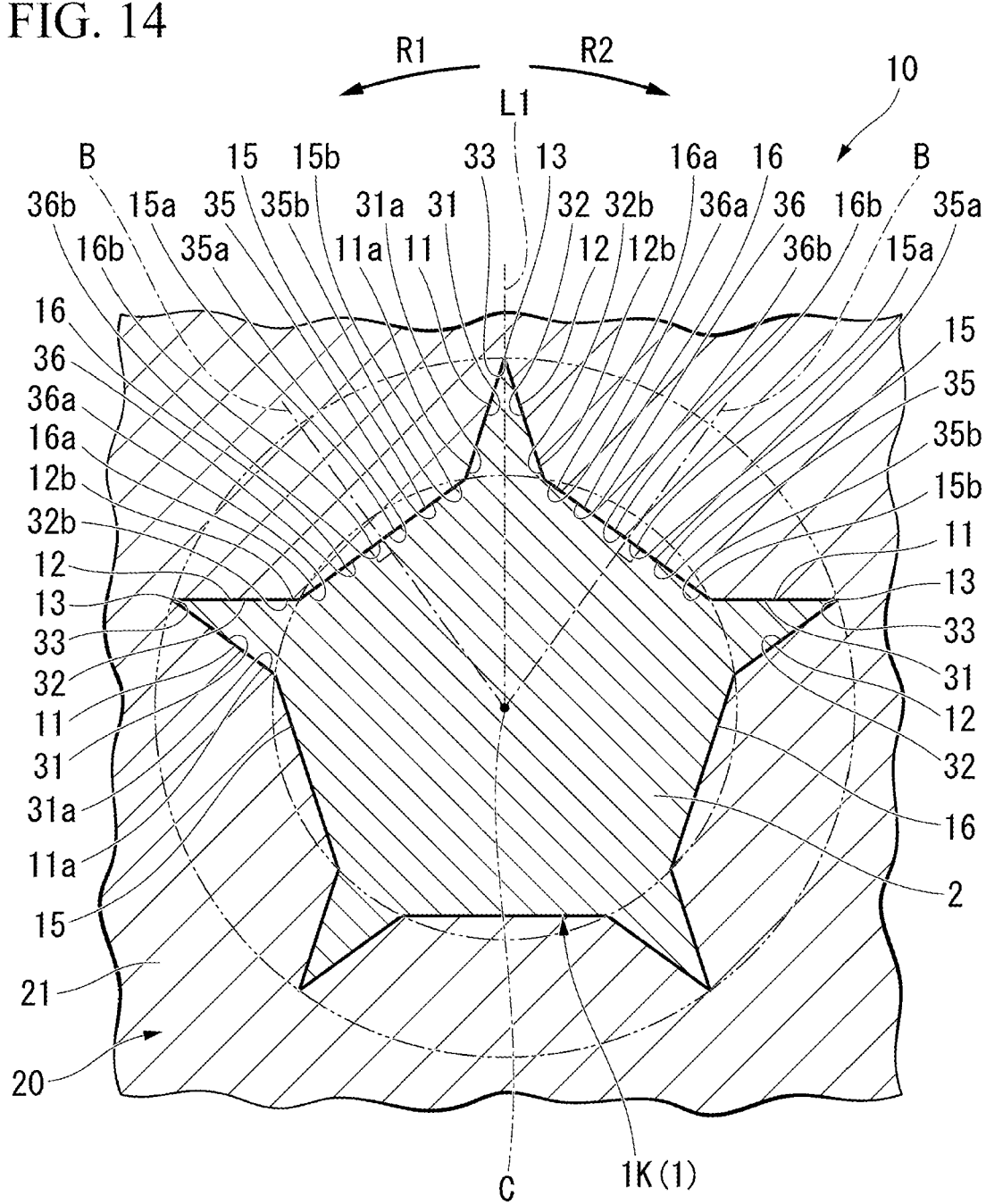
FIG. 14 is a cross-sectional view showing a tenth modification example of the hard sintered body of the first embodiment.

FIG. 14 shows the hard sintered body 10 and a base material 1K(1) for a hard sintered body according to a tenth modification example of the present embodiment. In the tenth modification example, the pillar portion 2 has a third outer peripheral portion 15 and a fourth outer peripheral portion 16. In addition, the surrounding wall portion 21 (cylinder portion 20) has a third inner peripheral portion 35 and a fourth inner peripheral portion 36.

The third outer peripheral portion 15 is disposed in the outer peripheral portion of the pillar portion 2, and forms a part of the outer peripheral portion of the pillar portion 2. The third outer peripheral portion 15 forms a portion of the outer peripheral surface of the pillar portion 2 in the circumferential direction. A plurality of the third outer peripheral portions 15 are provided at an interval from each other in the circumferential direction.

In the cross-sectional view shown in FIG. 14, the third outer peripheral portion 15 extends in the circumferential direction or the radial direction. In the present embodiment, each of the third outer peripheral portions 15 extends in the circumferential direction. Specifically, each of the third outer peripheral portions 15 extends from the end portion on one side R1 in the circumferential direction of one side portion 11a of the first outer peripheral portion 11 toward one side R1 in the circumferential direction. The third outer peripheral portion 15 is located between the end portion on one side R1 in the circumferential direction of one side portion 11a of the first outer peripheral portion 11 in the circumferential direction and the bisector B. The third outer peripheral portion 15 extends to the bisector B from one side portion 11a of the first outer peripheral portion 11 toward one side R1 in the circumferential direction. In the cross-sectional view shown in FIG. 14, the third outer peripheral portion 15 has a linear shape in the present embodiment. The third outer peripheral portion 15 is located on a straight line connecting the end portion on one side R1 in the circumferential direction of one side portion 11a of the first outer peripheral portions 11 adjacent to each other in the circumferential direction and the end portion on the other side R2 in the circumferential direction of the other side portion 12b of the second outer peripheral portion 12.

In the cross-sectional view of FIG. 14, one side portion (first end portion) 15a of the third outer peripheral portion 15 is located inside the other side portion (second end portion) 15b in the radial direction. One side portion 15a of the third outer peripheral portion 15 includes a portion located on the bisector B. The other side portion 15b of the third outer peripheral portion 15 is connected to one side portion 11a of the first outer peripheral portion 11. The third outer peripheral portion 15 is located inward in the radial direction toward one side R1 in the circumferential direction. That is, the third outer peripheral portion 15 extends inward in the radial direction toward one side R1 in the circumferential direction.

One side portion 15a of the third outer peripheral portion 15 includes an end portion on one side R1 in the circumferential direction in the third outer peripheral portion 15. The other side portion 15b of the third outer peripheral portion 15 includes an end portion on the other side R2 in the circumferential direction in the third outer peripheral portion 15. One side portion 15a of the third outer peripheral portion 15 includes an end portion inside in the radial direction in the third outer peripheral portion 15, that is, an inner end portion in the radial direction. The other side portion 15b of the third outer peripheral portion 15 includes an end portion outside in the radial direction of the third outer peripheral portion 15, that is, an outer end portion in the radial direction.

The amount of displacement in the radial direction per unit length in the circumferential direction of the first outer peripheral portion 11 (that is, inclination with respect to the circumferential direction) is larger than the amount of displacement in the radial direction per unit length in the circumferential direction of the third outer peripheral portion 15.

The fourth outer peripheral portion 16 is disposed in the outer peripheral portion of the pillar portion 2, and forms a part of the outer peripheral portion of the pillar portion 2. The fourth outer peripheral portion 16 forms a portion of the outer peripheral surface of the pillar portion 2 in the circumferential direction. A plurality of the fourth outer peripheral portions 16 are provided at an interval from each other in the circumferential direction.

In the cross-sectional view shown in FIG. 14, the fourth outer peripheral portion 16 extends in the circumferential direction or the radial direction. In the present embodiment, each of the fourth outer peripheral portions 16 extends in the circumferential direction. Specifically, each of the fourth outer peripheral portions 16 extends from the end portion on the other side R2 of other side portion 12b of the second outer peripheral portion 12 in the circumferential direction toward the other side R2 in the circumferential direction. The fourth outer peripheral portion 16 is located between the end portion on the other side R2 in the circumferential direction of the other side portion 12b of the second outer peripheral portion 12 in the circumferential direction and the bisector B. The fourth outer peripheral portion 16 extends to the bisector B from the other side portion 12b of the second outer peripheral portion 12 toward the other side R2 in the circumferential direction. In the cross-sectional view shown in FIG. 14, the fourth outer peripheral portion 16 has a linear shape in the present embodiment. The fourth outer peripheral portion 16 is located on a straight line connecting the end portion on one side R1 in the circumferential direction of one side portion 11a of the first outer peripheral portions 11 adjacent to each other in the circumferential direction and the end portion on the other side R2 in the circumferential direction of the other side portion 12b of the second outer peripheral portion 12. That is, in the present embodiment, the third outer peripheral portion 15 and the fourth outer peripheral portion 16 are disposed adjacent to each other on both sides in the circumferential direction around the bisector B, on a straight line connecting one side portion 11a of the first outer peripheral portions 11 adjacent to each other in the circumferential direction and the other side portion 12b of the second outer peripheral portion 12.

In the cross-sectional view of FIG. 14, one side portion (first end portion) 16a of the fourth outer peripheral portion 16 is located outside the other side portion (second end portion) 16b in the radial direction. One side portion 16a of the fourth outer peripheral portion 16 is connected to the other side portion 12b of the second outer peripheral portion 12. The other side portion 16b of the fourth outer peripheral portion 16 includes a portion located on the bisector B. The fourth outer peripheral portion 16 is located outward in the radial direction toward one side R1 in the circumferential direction. That is, the fourth outer peripheral portion 16 extends outward in the radial direction toward one side R1 in the circumferential direction.

One side portion 16a of the fourth outer peripheral portion 16 includes an end portion on one side R1 in the circumferential direction in the fourth outer peripheral portion 16. The other side portion 16b of the fourth outer peripheral portion 16 includes an end portion on the other side R2 in the circumferential direction in the fourth outer peripheral portion 16. One side portion 16a of the fourth outer peripheral portion 16 includes an end portion outside in the radial direction in the fourth outer peripheral portion 16, that is, an outer end portion in the radial direction. The other side portion 16b of the fourth outer peripheral portion 16 includes an end portion inside in the radial direction in the fourth outer peripheral portion 16, that is, an inner end portion in the radial direction.

In the cross-sectional view shown in FIG. 14, the third outer peripheral portion 15 and the fourth outer peripheral portion 16 are connected to each other. The third outer peripheral portion 15 and the fourth outer peripheral portion 16 are connected to each other in the circumferential direction.

The third outer peripheral portion 15 and the fourth outer peripheral portion 16 which are adjacent to each other in the circumferential direction are connected to each other on the bisector B. That is, one side portion 15a of the third outer peripheral portion 15 and the other side portion 16b of the fourth outer peripheral portion 16 are connected on the bisector B.

The amount of displacement in the radial direction per unit length in the circumferential direction of the second outer peripheral portion 12 is larger than the amount of displacement in the radial direction per unit length in the circumferential direction of the fourth outer peripheral portion 16.

The third inner peripheral portion 35 is disposed in the inner peripheral portion of the surrounding wall portion 21. That is, the third inner peripheral portion 35 is disposed in the inner peripheral portion of the cylinder portion 20, and forms a part of the inner peripheral portion of the cylinder portion 20. The third inner peripheral portion 35 forms a portion of the inner peripheral surface of the surrounding wall portion 21 (cylinder portion 20) in the circumferential direction. A plurality of the third inner peripheral portions 35 are provided at an interval from each other in the circumferential direction.

In the cross-sectional view shown in FIG. 14, the third inner peripheral portion 35 extends in the circumferential direction or the radial direction. In the present embodiment, each of the third inner peripheral portions 35 extends in the circumferential direction. Specifically, each of the third inner peripheral portions 35 extends from the end portion on one side R1 in the circumferential direction of one side portion 31a of the first inner peripheral portion 31 toward one side R1 in the circumferential direction. The third inner peripheral portion 35 is located between the end portion on one side R1 in the circumferential direction of one side portion 31a of the first inner peripheral portion 31 and the bisector B in the circumferential direction. The third inner peripheral portion 35 extends to the bisector B from one side portion 31a of the first inner peripheral portion 31 toward one side R1 in the circumferential direction. In the cross-sectional view shown in FIG. 14, the third inner peripheral portion 35 has a linear shape in the present embodiment. The third inner peripheral portion 35 is located on a straight line connecting the end portion on one side R1 in the circumferential direction of one side portion 31a of the first inner peripheral portions 31 adjacent to each other in the circumferential direction and the end portion on the other side R2 in the circumferential direction of the other side portion 32b of the second inner peripheral portion 32.

In the cross-sectional view of FIG. 14, one side portion (first end portion) 35a of the third inner peripheral portion 35 is located inside the other side portion (second end portion) 35b in the radial direction. One side portion 35a of the third inner peripheral portion 35 includes a portion located on the bisector B. The other side portion 35b of the third inner peripheral portion 35 is connected to one side portion 31a of the first inner peripheral portion 31. The third inner peripheral portion 35 is located inward in the radial direction toward one side R1 in the circumferential direction. That is, the third inner peripheral portion 35 extends inward in the radial direction toward one side R1 in the circumferential direction.

One side portion 35a of the third inner peripheral portion 35 includes an end portion on one side R1 in the circumferential direction in the third inner peripheral portion 35. The other side portion 35b of the third inner peripheral portion 35 includes an end portion on the other side R2 in the circumferential direction in the third inner peripheral portion 35. One side portion 35a of the third inner peripheral portion 35 includes an end portion inside in the radial direction in the third inner peripheral portion 35, that is, an inner end portion in the radial direction. The other side portion 35b of the third inner peripheral portion 35 includes an end portion outside in the radial direction in the third inner peripheral portion 35, that is, an outer end portion in the radial direction.

The amount of displacement in the radial direction per unit length in the circumferential direction of the first inner peripheral portion 31 (that is, inclination with respect to the circumferential direction) is larger than the amount of displacement in the radial direction per unit length in the circumferential direction of the third inner peripheral portion 35.

Each of the third inner peripheral portions 35 is in contact with each of the third outer peripheral portions 15. The third outer peripheral portion 15 and the third inner peripheral portion 35 are bonded to each other. One side portion 15a of the third outer peripheral portion 15 and one side portion 35a of the third inner peripheral portion 35 are bonded to each other while facing each other in the radial direction. The other side portion 15b of the third outer peripheral portion 15 and the other side portion 35b of the third inner peripheral portion 35 are bonded to each other while facing each other in the radial direction.

The fourth inner peripheral portion 36 is disposed in the inner peripheral portion of the surrounding wall portion 21. That is, the fourth inner peripheral portion 36 is disposed in the inner peripheral portion of the cylinder portion 20, and forms a part of the inner peripheral portion of the cylinder portion 20. The fourth inner peripheral portion 36 forms a portion of the inner peripheral surface of the surrounding wall portion 21 in the circumferential direction. A plurality of the fourth inner peripheral portions 36 are provided at an interval from each other in the circumferential direction.

In the cross-sectional view shown in FIG. 14, the fourth inner peripheral portion 36 extends in the circumferential direction or the radial direction. In the present embodiment, each of the fourth inner peripheral portions 36 extends in the circumferential direction. Specifically, each of the fourth inner peripheral portions 36 extends from the end portion on the other side R2 in the circumferential direction of the other side portion 32b of the second inner peripheral portion 32 toward the other side R2 in the circumferential direction. The fourth inner peripheral portion 36 is located between the end portion on the other side R2 in the circumferential direction of the other side portion 32b of the second inner peripheral portion 32 and the bisector B in the circumferential direction. The fourth inner peripheral portion 36 extends to the bisector B from the other side portion 32b of the second inner peripheral portion 32 toward the other side R2 in the circumferential direction. In the cross-sectional view shown in FIG. 14, the fourth inner peripheral portion 36 has a linear shape in the present embodiment. The fourth inner peripheral portion 36 is located on a straight line connecting the end portion on one side R1 in the circumferential direction of one side portion 31a of the first inner peripheral portions 31 adjacent to each other in the circumferential direction and the end portion on the other side R2 in the circumferential direction of the other side portion 32b of the second inner peripheral portion 32. That is, in the present embodiment, the third inner peripheral portion 35 and the fourth inner peripheral portion 36 are disposed adjacent to each other on both sides in the circumferential direction around the bisector B, on the straight line connecting one side portion 31a of the first inner peripheral portions 31 adjacent to each other in the circumferential direction and the other side portion 32b of the second inner peripheral portion 32.

In the cross-sectional view of FIG. 14, one side portion (first end portion) 36a of the fourth inner peripheral portion 36 is located outside the other side portion (second end portion) 36b in the radial direction. One side portion 36a of the fourth inner peripheral portion 36 is connected to the other side portion 32b of the second inner peripheral portion 32. The other side portion 36b of the fourth inner peripheral portion 36 includes a portion located on the bisector B. The fourth inner peripheral portion 36 is located outward in the radial direction toward one side R1 in the circumferential direction. That is, the fourth inner peripheral portion 36 extends outward in the radial direction toward one side R1 in the circumferential direction.

One side portion 36a of the fourth inner peripheral portion 36 includes an end portion on one side R1 in the circumferential direction in the fourth inner peripheral portion 36. The other side portion 36b of the fourth inner peripheral portion 36 includes an end portion on the other side R2 in the circumferential direction in the fourth inner peripheral portion 36. One side portion 36a of the fourth inner peripheral portion 36 includes an end portion outside in the radial direction in the fourth inner peripheral portion 36, that is, an outer end portion in the radial direction. The other side portion 36b of the fourth inner peripheral portion 36 includes an end portion inside in the radial direction in the fourth inner peripheral portion 36, that is, an inner end portion in the radial direction.

In the cross-sectional view shown in FIG. 14, the third inner peripheral portion 35 and the fourth inner peripheral portion 36 are connected to each other. The third inner peripheral portion 35 and the fourth inner peripheral portion 36 are connected to each other in the circumferential direction.

The third inner peripheral portion 35 and the fourth inner peripheral portion 36 which are adjacent to each other in the circumferential direction are connected to each other on the bisector B. That is, one side portion 35a of the third inner peripheral portion 35 and the other side portion 36b of the fourth inner peripheral portion 36 are connected on the bisector B.

The amount of displacement in the radial direction per unit length in the circumferential direction of the second inner peripheral portion 32 is larger than the amount of displacement in the radial direction per unit length in the circumferential direction of the fourth inner peripheral portion 36.

Each of the fourth inner peripheral portions 36 is in contact with each of the fourth outer peripheral portions 16. The fourth outer peripheral portion 16 and the fourth inner peripheral portion 36 are bonded to each other. One side portion 16a of the fourth outer peripheral portion 16 and one side portion 36a of the fourth inner peripheral portion 36 are bonded to each other while facing each other in the radial direction. The other side portion 16b of the fourth outer peripheral portion 16 and the other side portion 36b of the fourth inner peripheral portion 36 are bonded to each other while facing each other in the radial direction.

According to the tenth modification example, since the base material 1K has the third outer peripheral portion 15 and the fourth outer peripheral portion 16, for example, compared to the base material 1J shown in FIG. 13, the wall thickness of the pillar portion 2 can be secured, and the rigidity of the pillar portion 2 is secured. Then, the first outer peripheral portion 11 can easily face the circumferential direction. In addition, when the cutting operation is performed on the hard sintered body 10 in which the base material 1K and the cylinder portion 20 are sintered by using the cutting portion 51 of the cutting tool 50, the load can be easily received by the first outer peripheral portion 11 and the third outer peripheral portion 15. Therefore, it is possible to stably prevent the occurrence of cracks or chips near the interface between the base material 1K and the cylinder portion 20, and it is possible to further improve the fracturing resistance of the cutting tool 50.

Figure 15A:
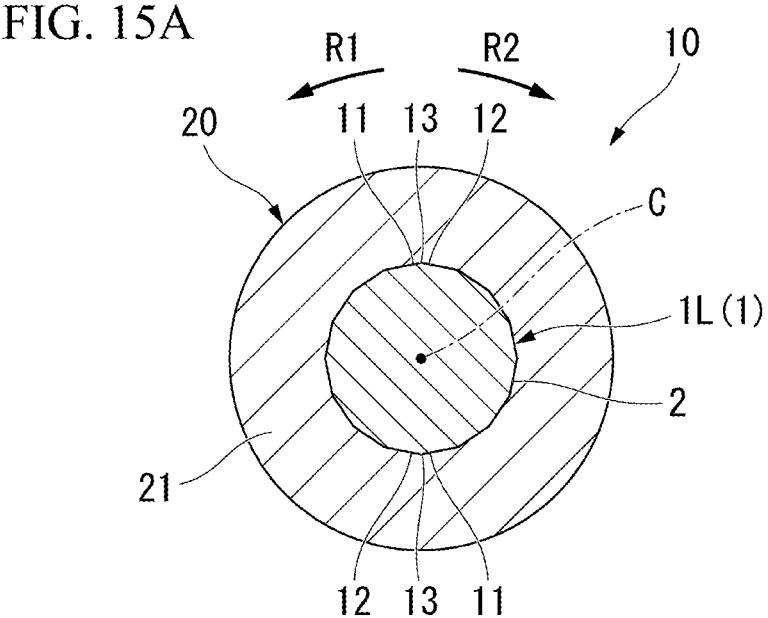
FIG. 15A is a cross-sectional view showing an eleventh modification example of the hard sintered body of the first embodiment.
Figure 15B:
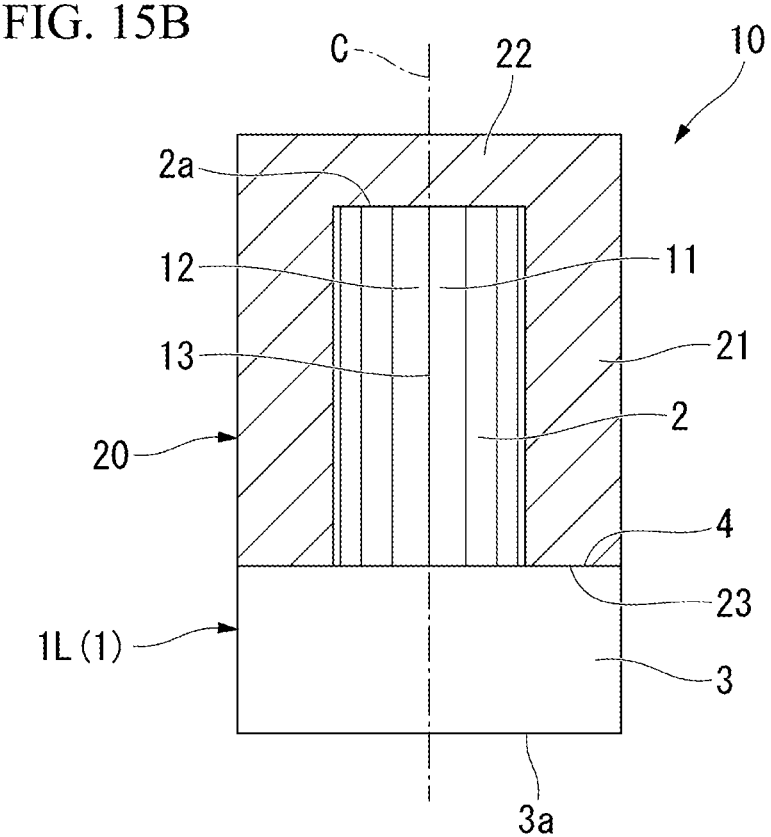
FIG. 15B is a vertical sectional view showing the eleventh modification example of the hard sintered body of the first embodiment (a side view of the base material for the hard sintered body and a vertical sectional view of the cylinder portion).

FIGS. 15A and 15B show the hard sintered body 10 and a base material 1L(1) for a hard sintered body according to an eleventh modification example of the present embodiment. In the eleventh modification example, the pillar portion 2 of the base material 1L has a hexadecagonal shape, specifically, a regular hexadecagonal shape in the cross-sectional view perpendicular to the central axis C shown in FIG. 15A. That is, the number of apexes of the pillar portion 2 (protruding stripe portion 13 of the base material) exceeds eight.

In this case, for example, compared to a case where the pillar portion 2 has an octagonal shape in the cross-sectional view perpendicular to the central axis C, the first outer peripheral portion 11 and the protruding stripe portion of the base material 13 can be easily disposed directly below the cutting edge 56. That is, when viewed in the radial direction, the first outer peripheral portion 11, the protruding stripe portion of the base material 13, and the cutting edge 56 are more likely to intersect with each other. In this manner, during the cutting operation, the load can be easily received by the first outer peripheral portion 11 and the protruding stripe portion of the base material 13. Therefore, it is possible to stably prevent the occurrence of cracks or chips near the interface between the base material 1L and the cylinder portion 20, and it is possible to further improve the fracturing resistance of the cutting tool 50.

Figure 16:
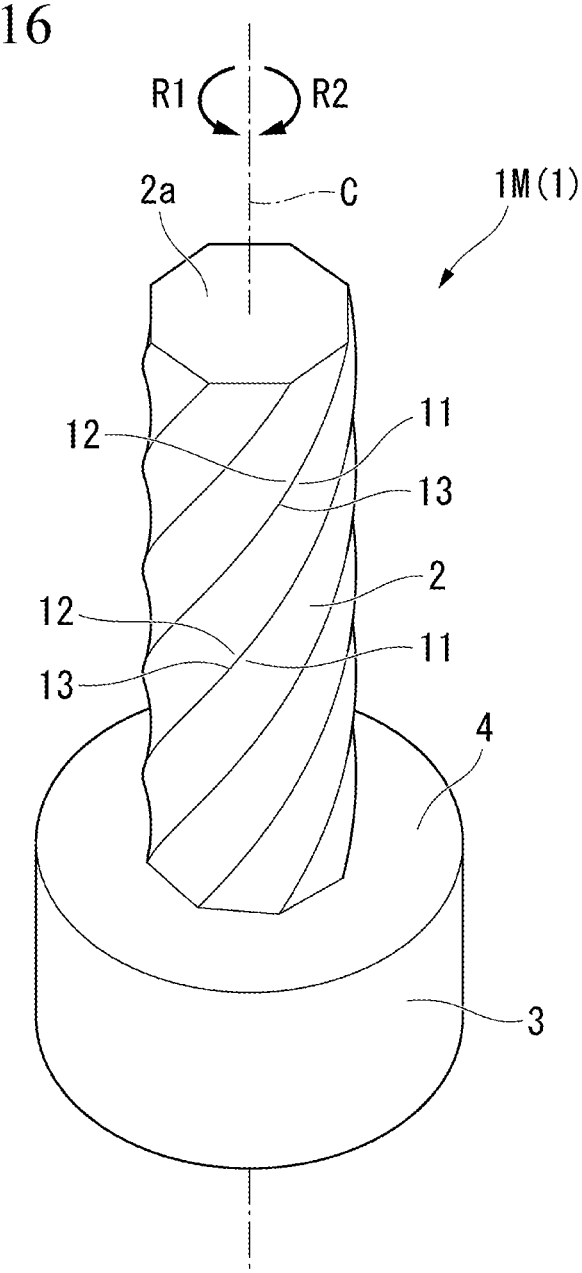
FIG. 16 is a perspective view showing a twelfth modification example of the base material for the hard sintered body of the first embodiment.

FIG. 16 shows a base material 1M(1) for a hard sintered body according to a twelfth modification example of the present embodiment. In the twelfth modification example, the protruding stripe portion of the base material 13 extends in the circumferential direction as the protruding stripe portion of the base material 13 faces the axial direction. That is, the protruding stripe portion of the base material 13 extends to be twisted in a helical shape around the central axis C. Specifically, the protruding stripe portion of the base material 13 extends toward one side R1 in the circumferential direction as the protruding stripe portion of the base material 13 faces one side in the axial direction.

Although not particularly shown, the cylinder portion 20 sintered integrally with the base material 1M has the recessed stripe portion 33 of the cylinder portion in the surrounding wall portion 21. The recessed stripe portion 33 of the cylinder portion extends in the circumferential direction as the recessed stripe portion 33 of the cylinder portion faces the axial direction. That is, the recessed stripe portion 33 of the cylinder portion extends to be twisted in a helical shape around the central axis C. Specifically, the recessed stripe portion 33 of the cylinder portion extends toward one side R1 in the circumferential direction as the recessed stripe portion 33 of the cylinder portion faces one side in the axial direction.

According to the twelfth modification example, for example, even when the cutting tool 50 is the reamer and the cutting edge 56 is a so-called straight cutting portion extending along the central axis C, when viewed in the radial direction, the other side portion 11b (protruding stripe portion 13 of the base material) of the first outer peripheral portion 11 and the cutting edge 56 can stably and easily intersect with each other. Therefore, when the cutting operation is performed by the cutting tool 50, the load applied to the cutting edge 56 in the circumferential direction can be easily received by the first outer peripheral portion 11 and the protruding stripe portion of the base material 13 of the base material 1M. It is possible to prevent the occurrence of cracks or chips near the interface between the base material 1M and the cylinder portion 20. The fracturing resistance of the cutting tool 50 can be improved, and the tool life can be extended.

When the twelfth modification example is applied to the cutting tool 50 such as the end mill having the cutting edge 56 extending in a helical shape around the central axis C while being twisted, a configuration may be adopted as follows. The other side portion 11b (protruding stripe portion 13 of the base material) of the first outer peripheral portion 11 of the base material 1M may be disposed directly below the cutting edge 56, that is, at a position substantially overlapping the cutting edge 56 when viewed in the radial direction, and may extend to be twisted in a helical shape around the central axis C at a helix angle equal to that of the cutting edge 56.

In addition, a direction in which the protruding stripe portion of the base material 13 is twisted may be set as a direction opposite to a direction in which the cutting edge 56 is twisted. That is, in a case where the cutting edge 56 extends toward one side R1 in the circumferential direction as the cutting edge 56 moves toward one side in the axial direction, the protruding stripe portion of the base material 13 may be configured to extend toward the other side R2 in the circumferential direction, as the protruding stripe portion of the base material 13 faces one side in the axial direction. In this case, when viewed in the radial direction, the other side portion 11b (protruding stripe portion 13 of the base material) of the first outer peripheral portion 11 and the cutting edge 56 more stably intersect with each other.

Figure 17A:
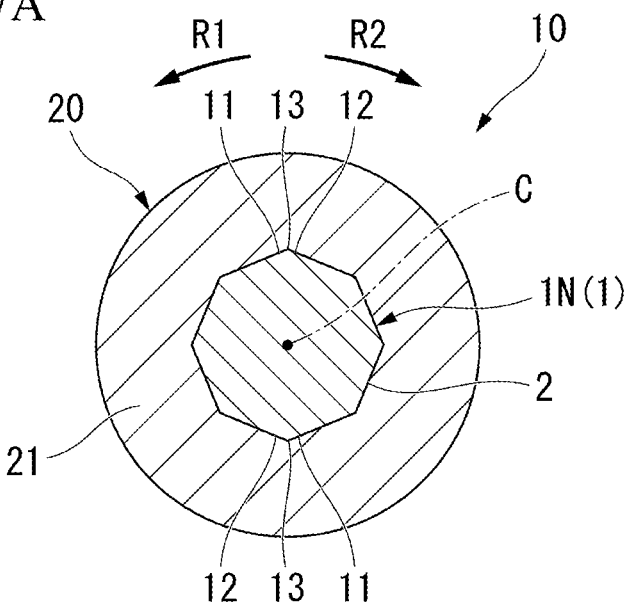
FIG. 17A is a cross-sectional view showing a thirteenth modification example of the hard sintered body of the first embodiment.
Figure 17B:
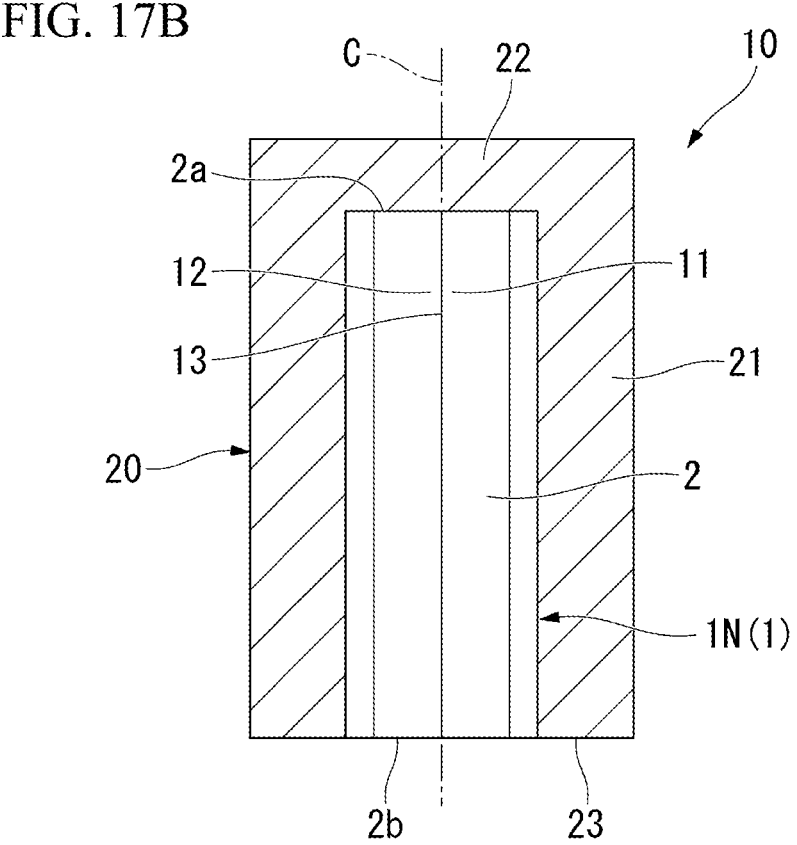
FIG. 17B is a vertical sectional view showing the thirteenth modification example of the hard sintered body of the first embodiment (a side view of the base material for the hard sintered body and a vertical sectional view of the cylinder portion).

FIGS. 17A and 17B show the hard sintered body 10 and a base material 1N(1) for a hard sintered body according to a thirteenth modification example of the present embodiment. In the thirteenth modification example, the base material 1N has the smaller-diameter portion (pillar portion) 2, and does not have the larger-diameter portion 3 and the base material end surface 4. The end surface 2b of the pillar portion 2 which faces the other side in the axial direction is exposed on the other side in the axial direction. The end surface 2b of the pillar portion 2 which faces the other side in the axial direction has a planar shape perpendicular to the central axis C. The end surface 2b of the pillar portion 2 which faces the other side in the axial direction has a polygonal shape. The cylinder portion end surface 23 of the cylinder portion 20 is disposed to be flush with the end surface 2b of the pillar portion 2 which faces the other side in the axial direction. The cylinder portion end surface 23 is exposed on the other side in the axial direction.

Figure 18A:
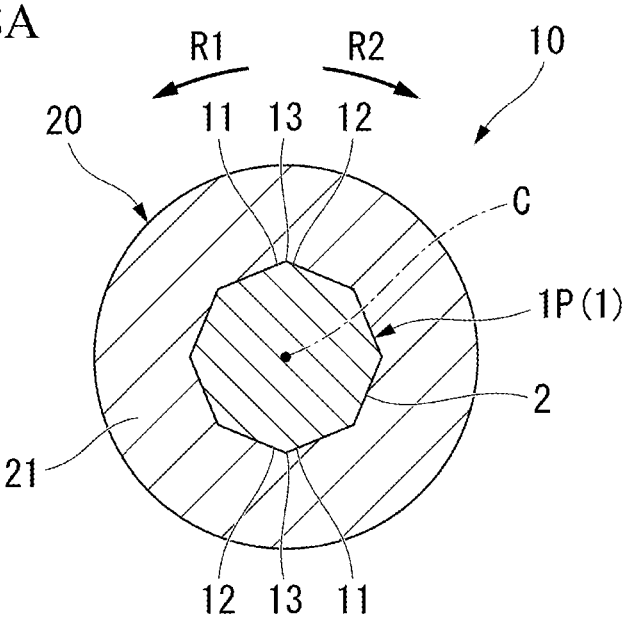
FIG. 18A is a cross-sectional view showing a fourteenth modification example of the hard sintered body of the first embodiment.
Figure 18B:
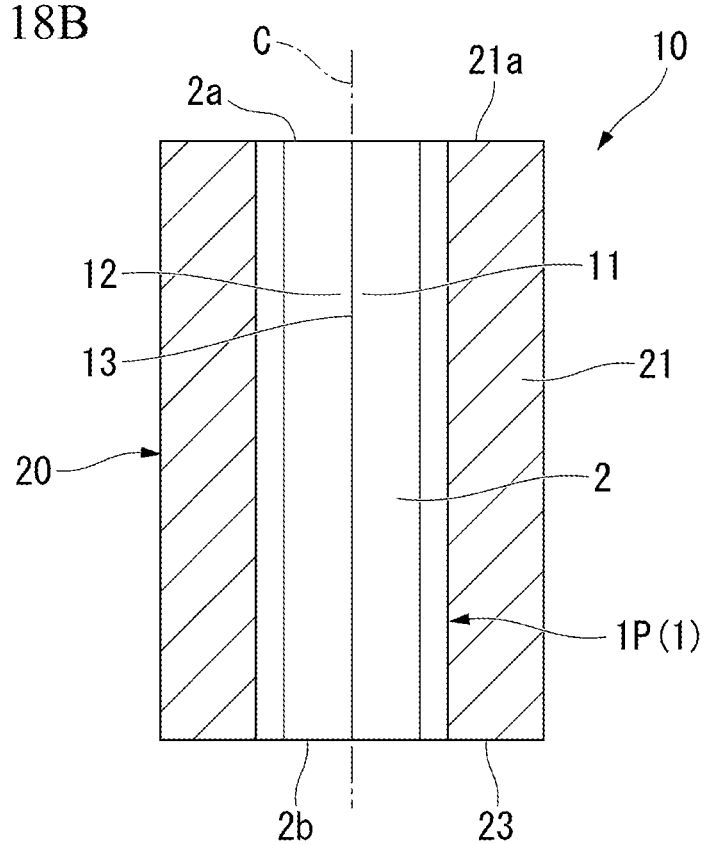
FIG. 18B is a vertical sectional view showing the fourteenth modification example of the hard sintered body of the first embodiment (a side view of the base material for the hard sintered body and a vertical sectional view of the cylinder portion).

FIGS. 18A and 18B show the hard sintered body 10 and a base material 1P(1) for a hard sintered body according to a fourteenth modification example of the present embodiment. In the fourteenth modification example, the cylinder portion 20 has the surrounding wall portion 21 and the cylinder portion end surface 23, and does not have the top wall portion 22. The end surface 2a of the pillar portion 2 which faces one side in the axial direction is exposed on one side in the axial direction. The end surface 21a of the surrounding wall portion 21 which faces one side in the axial direction has a circular ring shape around the central axis C. The end surface 21a of the surrounding wall portion 21 which faces one side in the axial direction has a planar shape perpendicular to the central axis C. The end surface 21a of the surrounding wall portion 21 which faces one side in the axial direction is disposed to be flush with the end surface 2a of the pillar portion 2 which faces one side in the axial direction. The end surface 21a of the surrounding wall portion 21 which faces one side in the axial direction is exposed on one side in the axial direction.

Figure 19A:
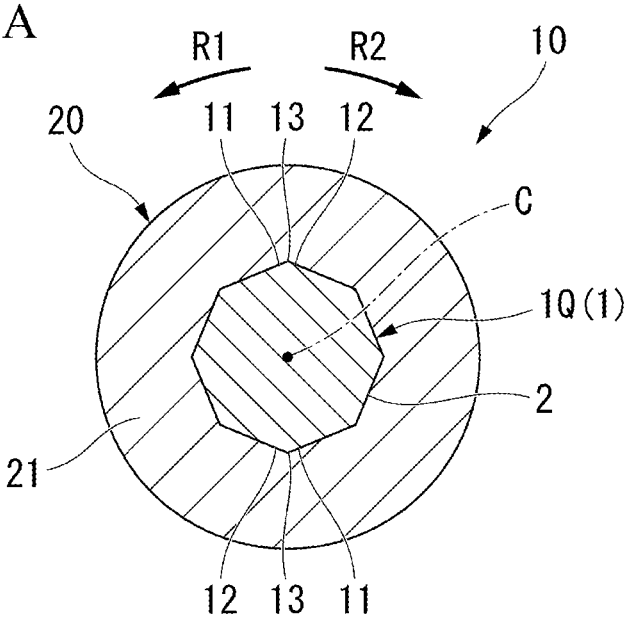
FIG. 19A is a cross-sectional view showing a fifteenth modification example of the hard sintered body of the first embodiment.
Figure 19B:
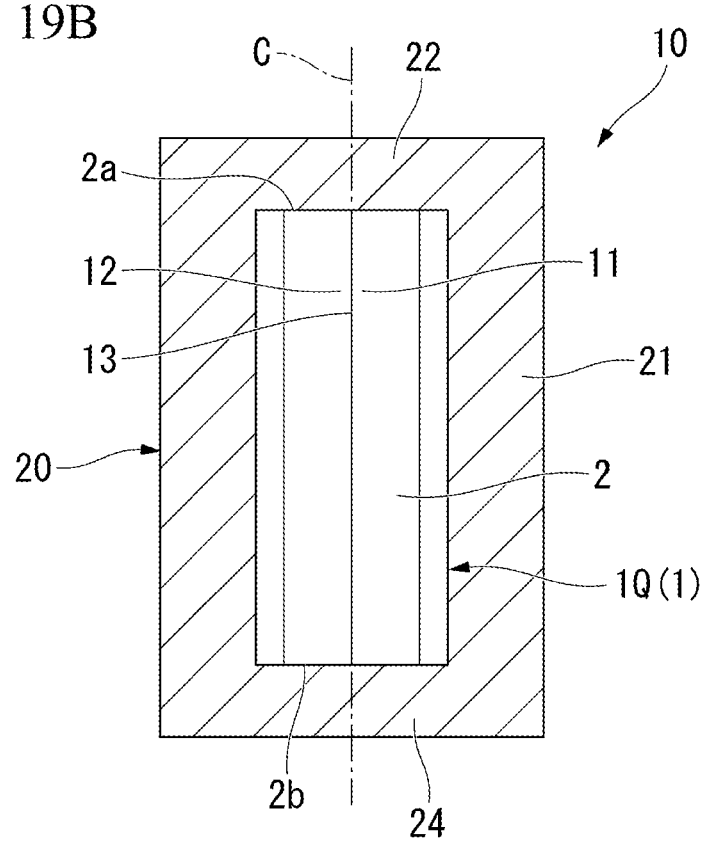
FIG. 19B is a vertical sectional view showing the fifteenth modification example of the hard sintered body of the first embodiment (a side view of the base material for the hard sintered body and a vertical sectional view of the cylinder portion).

FIGS. 19A and 19B show the hard sintered body 10 and a base material 1Q(1) for a hard sintered body according to a fifteenth modification example of the present embodiment. In the fifteenth modification example, the cylinder portion 20 covers the pillar portion 2 (base material 1Q) from the outside in the radial direction and from both sides in the axial direction. The cylinder portion 20 has the surrounding wall portion 21, the top wall portion 22, and the bottom wall portion 24. The bottom wall portion 24 is connected to the end portion on the other side in the axial direction of the surrounding wall portion 21. The bottom wall portion 24 has a disk shape around the central axis C. A pair of plate surfaces of the bottom wall portion 24 faces the axial direction. The plate surface of the bottom wall portion 24 which faces one side in the axial direction is fixed to the end surface 2b of the pillar portion 2 which faces the other side in the axial direction. The plate surface of the bottom wall portion 24 which faces one side in the axial direction is bonded to the end surface 2b of the pillar portion 2 which faces the other side in the axial direction.

Second Embodiment

Figure 20:
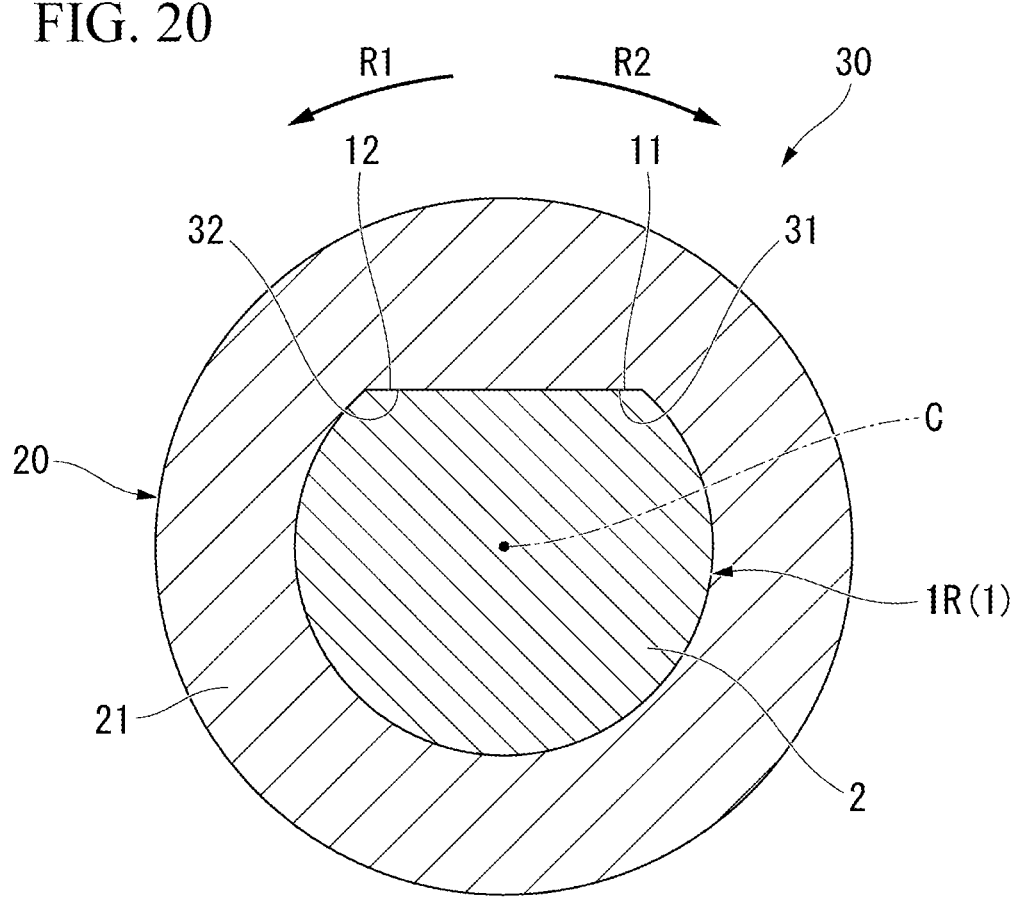
FIG. 20 is a cross-sectional view showing a hard sintered body of a second embodiment.

Next, a hard sintered body 30 and the cutting tool 50 according to a second embodiment of the present invention will be described with reference to FIG. 20. In the second embodiment, the same reference numerals will be assigned to the same components as those in the first embodiment, and description thereof will be omitted.

The hard sintered body 30 of the present embodiment includes a base material 1R(1) and a cylinder portion 20 sintered integrally with the base material 1R.

The base material 1R has the pillar portion 2. The pillar portion 2 has one first outer peripheral portion 11 and one second outer peripheral portion 12. The cylinder portion 20 has the surrounding wall portion 21. The surrounding wall portion 21 has one first inner peripheral portion 31 and one second inner peripheral portion 32.

The first outer peripheral portion 11 and the first inner peripheral portion 31 are bonded to each other. The second outer peripheral portion 12 and the second inner peripheral portion 32 are bonded to each other.

In the cutting tool 50 of the present embodiment, the outer peripheral portion of the hard sintered body 30 described above includes the cutting portion 51 provided with the chip discharge groove 55 and the cutting edge 56 which extend in the axial direction, and the shank 52 connected to the cutting portion 51 in the axial direction (refer to FIG. 4).

According to the present embodiment, when the hard sintered body 30 is subjected to a cutting operation by using the cutting portion 51 of the cutting tool 50, the first outer peripheral portion 11 adopts a posture facing the tool rotation direction T. In this manner, the load applied to the cutting tool 50 in the circumferential direction can be received by the first outer peripheral portion 11 of the base material 1R. In this manner, out of the loads applied to the cutting tool 50 during the cutting operation, it is possible to prevent a possibility that the load applied in the direction perpendicular to the central axis C of the tool may act along the interface between the base material 1R and the cylinder portion 20. That is, a shearing force along the interface can be reduced, and it is possible to prevent the occurrence of cracks or chips near the interface between the base material 1R and the cylinder portion 20. Therefore, the fracturing resistance of the cutting tool 50 manufactured by using the hard sintered body 30 can be improved, and the tool life can be extended.

FIG. 21 shows the hard sintered body 30 and a base material 1S(1) for a hard sintered body according to a first modification example of the present embodiment. In the first modification example, the pillar portions 2 of the base material 1S has a plurality of the first outer peripheral portions 11 disposed at an interval from each other in the circumferential direction, a plurality of the second outer peripheral portions 12 disposed at an interval from each other in the circumferential direction, and a plurality of the base material recessed stripe portions 14 disposed at an interval from each other in the circumferential direction. The surrounding wall portion 21 of the cylinder portion 20 has a plurality of the first inner peripheral portions 31 disposed at an interval from each other in the circumferential direction, a plurality of the second inner peripheral portions 32 disposed at an interval from each other in the circumferential direction, and a plurality of cylinder portion protruding stripe portions 34 disposed at an interval from each other in the circumferential direction.

Each of the first outer peripheral portions 11 and each of the first inner peripheral portions 31 are bonded to each other. Each of the second outer peripheral portions 12 and each of the second inner peripheral portions 32 are bonded to each other. Each of the base material recessed stripe portions 14 and each of the cylinder portion protruding stripe portion 34 are bonded to each other.

According to the first modification example, when the hard sintered body 30 in which the base material 1S and the cylinder portion 20 are sintered is subjected to a cutting operation by using the cutting portion 51 of the cutting tool 50, the above-described function of the first outer peripheral portion 11 can be obtained at a plurality of locations in the circumferential direction of the cutting tool 50. Therefore, it is possible to stably prevent the occurrence of cracks or chips near the interface between the base material 1S and the cylinder portion 20, and it is possible to further improve the fracturing resistance of the cutting tool 50.

In addition, since the base material recessed stripe portion 14 is provided, the first outer peripheral portion 11 can easily face the circumferential direction. Therefore, when the hard sintered body 30 is subjected to a cutting operation by using the cutting portion 51 of the cutting tool 50, the load can be more easily received in the first outer peripheral portion 11.

Figure 22:
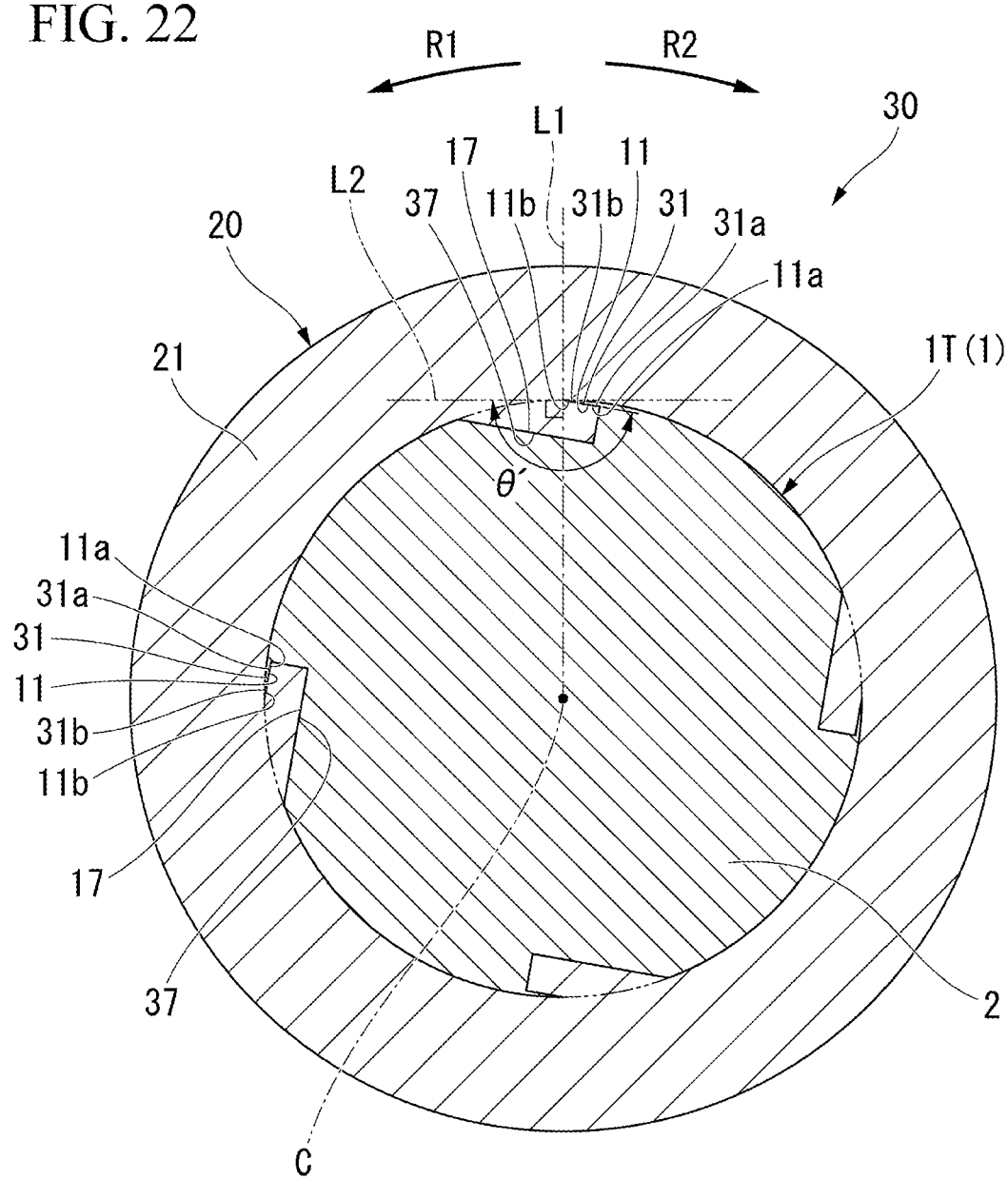
FIG. 22 is a cross-sectional view showing a second modification example of the hard sintered body of the second embodiment.

FIG. 22 shows the hard sintered body 30 and a base material 1T(1) for a hard sintered body according to a second modification example of the present embodiment. In the second modification example, the pillar portion 2 of the base material 1T has a plurality of groove portions 17 disposed at an interval from each other in the circumferential direction, and a plurality of the first outer peripheral portions 11. The groove portion 17 is recessed inward in the radial direction from the outer peripheral surface of the pillar portion 2, and extends in the axial direction. The first outer peripheral portion 11 is disposed on a wall surface of the groove portion 17 which faces one side R1 in the circumferential direction. The first outer peripheral portion 11 is disposed in the outer peripheral portion (that is, the outer end portion in the radial direction) of the pillar portion 2, and forms a part of the outer peripheral portion of the pillar portion 2.

In the cross-sectional view perpendicular to the central axis C shown in FIG. 22, one side portion (first end portion) 11a of the first outer peripheral portion 11 is located inside the other side portion (second end portion) 11b in the radial direction. The other side portion 11b of the first outer peripheral portion 11 includes a portion located on the outer peripheral surface of the pillar portion 2. The first outer peripheral portion 11 is located inward in the radial direction toward the other side R2 in the circumferential direction. That is, the first outer peripheral portion 11 extends inward in the radial direction toward the other side R2 in the circumferential direction.

One side portion 11a of the first outer peripheral portion 11 includes an end portion on the other side R2 in the circumferential direction in the first outer peripheral portion 11. The other side portion 11b of the first outer peripheral portion 11 includes an end portion on the one side R1 in the circumferential direction in the first outer peripheral portion 11. One side portion 11a of the first outer peripheral portion 11 includes an end portion inside in the radial direction in the first outer peripheral portion 11, that is, an inner end portion in the radial direction. The other side portion 11b of the first outer peripheral portion 11 includes an end portion outside in the radial direction in the first outer peripheral portion 11, that is, an outer end portion in the radial direction.

The surrounding wall portion 21 of the cylinder portion 20 has a plurality of insertion portions 37 disposed at an interval from each other in the circumferential direction, and a plurality of the first inner peripheral portions 31. The insertion portion 37 protrudes inward in the radial direction from the inner peripheral surface of the surrounding wall portion 21, and extends in the axial direction. Each of the insertion portions 37 is disposed inside each of the groove portions 17. Each of the insertion portions 37 is bonded to each of the groove portions 17. The first inner peripheral portion 31 is disposed on a wall surface of the insertion portion 37 which faces the other side R2 in the circumferential direction. The first inner peripheral portion 31 is disposed in the inner peripheral portion (that is, the inner end portion in the radial direction) of the cylinder portion 20, and forms a part of the inner peripheral portion of the cylinder portion 20.

In the cross-sectional view perpendicular to the central axis C shown in FIG. 22, one side portion (first end portion) 31a of the first inner peripheral portion 31 is located inside the other side portion (second end portion) 31b in the radial direction. The other side portion 31b of the first inner peripheral portion 31 includes a portion located on the inner peripheral surface of the surrounding wall portion 21. The first inner peripheral portion 31 is located inward in the radial direction toward the other side R2 in the circumferential direction. That is, the first inner peripheral portion 31 extends inward in the radial direction toward the other side R2 in the circumferential direction.

One side portion 31a of the first inner peripheral portion 31 includes an end portion on the other side R2 in the circumferential direction in the first inner peripheral portion 31. The other side portion 31b of the first inner peripheral portion 31 includes an end portion on one side R1 in the circumferential direction in the first inner peripheral portion 31. One side portion 31a of the first inner peripheral portion 31 includes an end portion inside in the radial direction in the first inner peripheral portion 31, that is, an inner end portion in the radial direction. The other side portion 31b of the first inner peripheral portion 31 includes an end portion outside in the radial direction in the first inner peripheral portion 31, that is, an outer end portion in the radial direction.

The first outer peripheral portion 11 and the first inner peripheral portion 31 are bonded to each other.

In the cross-sectional view of FIG. 22, an angle θ' in which the first outer peripheral portion 11 is inclined with respect to the second straight line L2 passing over the outer end portion of the first outer peripheral portion 11 in the radial direction and being orthogonal to the first straight line L1 passing through the outer end portion of the first outer peripheral portion 11 in the radial direction and the central axis C and extending in the radial direction, is 170° or smaller. The angle θ' is the angle at which the first outer peripheral portion 11 is inclined from the second straight line L2 in the rotation direction on the other side R2 in the circumferential direction. In the cross-sectional view, all of the angles θ' of the plurality of first outer peripheral portions 11 are equal to each other.

In the second modification example, the first outer peripheral portion 11 faces inward in the radial direction. Specifically, the first outer peripheral portion 11 extends from the outer end portion of the first outer peripheral portion 11 in the radial direction toward the other side R2 in the circumferential direction. In the cross-sectional view of FIG. 22, the angle θ' in this case indicates an obtuse angle out of an acute angle and the obtuse angle which are formed by intersection between the second straight line L2 and the first outer peripheral portion 11.

When the angle θ' at which the first outer peripheral portion 11 is inclined with respect to the second straight line L2 in the cross-sectional view perpendicular to the central axis C is 170° or smaller, the wall thickness near the first outer peripheral portion 11 in the base material 1T is secured, and the rigidity of the base material 1T is secured. For example, it is possible to prevent a problem that the partially thinned base material 1T causes a starting point of cracks. Therefore, the function of the first outer peripheral portion 11 is stabilized.

The present invention is not limited to the above-described embodiments. For example, as will be described below, the configuration can be changed within the scope not departing from the concept of the present invention.

In the above-described embodiments, an example has been described in which the cutting tool 50 is the end mill. However, the present invention is not limited thereto. The cutting tool 50 may be a reamer or a drill in addition to the end mill, and other rotary cutting tools. For example, when the cutting tool 50 is the drill, the cutting portion 51 includes a tip cutting edge, thinning, a margin, and a body clearance, in addition to the chip discharge groove 55 and the cutting edge 56.

In the above-described embodiments and modification examples, when the first outer peripheral portion 11 faces outward in the radial direction as shown in FIG. 3, the angle θ is smaller than 90°. When the first outer peripheral portion 11 faces inward in the radial direction as shown in FIG. 22, the angle θ' exceeds 90°. However, the present invention is not limited thereto. That is, in the cross-sectional view perpendicular to the central axis C, the angle at which the first outer peripheral portion 11 is inclined with respect to the second straight line L2 passing over the outer end portion of the first outer peripheral portion 11 in the radial direction and being orthogonal to the first straight line L1 passing through the outer end portion of the first outer peripheral portion 11 in the radial direction and the central axis C and extending in the radial direction, may be 90°. The angle may be rephrased as the angle at which the first outer peripheral portion 11 intersects with the second straight line L2. In this case, in a cross-sectional view perpendicular to the central axis C, the first outer peripheral portion 11 extends along the radial direction.

In addition, all of the configurations (components) described in the embodiments, modification examples, and proviso may be combined with each other within the scope not departing from the concept of the present invention. Alternatively, additions, omissions, substitutions, and other modifications can be made to the configuration. In addition, the present invention is not limited to the above-described embodiments, and is limited only by the scope of the claims

EXAMPLES

Hereinafter, the present invention will be specifically described with reference to an example. However, the present invention is not limited to the example.

Hard sintered bodies were prepared as an example and a comparative example of the present invention. A base material of the hard sintered body is made of cemented carbide, and the cylinder portion is made of PCD. In both the example and the comparative example, the Young's modulus of the sintered base material is 570 GPa, and the Young's modulus of the cylinder portion is 920 GPa. In the example of the present invention, the base material 1 of the hard sintered body 10 has the pillar portion 2 having a regular polygonal shape in the cross-sectional view perpendicular to the central axis C. A distance from the central axis C of the pillar portion 2 to the protruding stripe portion of the base material 13 (outer end portion of the first outer peripheral portion 11 in the radial direction), that is, a radius was set to 5 mm, and a distance from the central axis C to the outer peripheral surface of the cylinder portion 20, that is, a radius was set to 7 mm A cross-sectional shape of the pillar portion 2, the number of the first outer peripheral portions 11, and the angle θ were set as shown in Table 1 below. The shank 52 made of the cemented carbide was bonded to the hard sintered body 10 manufactured by integrally sintering the base material 1 and the cylinder portion 20 by performing brazing using an Ag brazing material. The hard sintered body 10 was subjected to a grinding operation to form the cutting portion 51 of a three-blade end mill. The diameter (blade diameter) of the cutting portion 51 was set to 12 mm.

In the comparative example, the base material of the hard sintered body has the pillar portion having a circular shape in the cross-sectional view perpendicular to the central axis. That is, the base material of the comparative example has the pillar portion having a columnar shape, and does not have the first outer peripheral portion 11. The radius of the pillar portion was set to 5 mm, and the radius of the cylinder portion was set to 7 mm. The shank made of the cemented carbide was bonded to the hard sintered body manufactured by integrally sintering the base material and the cylinder portion by performing brazing using the Ag brazing material. The hard sintered body was subjected to a grinding operation as in the above-described embodiment to form the cutting portion of the three blade end mill. The diameter of the cutting portion (blade diameter) was set to 12 mm.

Both the example and comparative example were subjected to cutting tests under the following cutting conditions.
<Cutting Conditions>
Dry high-speed slot milling: CFRP (plate thickness 5 mm)
Cutting speed: 300 m/min
Feed speed: 955 mm/min
Cutting depth: 5 mm
Dry cutting (air blow)
Then, for each prescribed cutting length, whether or not there were cracks or chips in the interface between the base material and the cylinder portion, or the cylinder portion was observed. Where there were cracks or chips, a total cutting length from cutting start to the observation time was determined as a life (life cutting length). An optical microscope or an electron microscope was used for the observation. Test results are shown in Table 1.

INDUSTRIAL APPLICABILITY

According to the base material for the hard sintered body, the hard sintered body, and the cutting tool according to the present invention, it is possible to prevent the occurrence of cracks or chips near the interface between the base material and the cylinder portion. Therefore, the present invention is industrially applicable.

REFERENCE SIGNS LIST 1 (1A, 1B, 1C, 1D, 1E, 1F, 1G, 1H, 1I, 1J, 1K, 1L, 1M, 1N, 1P, 1Q, 1R, 1S, 1T): Base material
2: Smaller-diameter portion (pillar portion)
10, 30: Hard sintered body
11: First outer peripheral portion
11a: One side portion of first outer peripheral portion
11b: Other side portion of first outer peripheral portion
12: Second outer peripheral portion
12a: Portion on one side of second outer peripheral portion
12b: Portion on other side of second outer peripheral portion
13: protruding stripe portion (of the base material)
14: Base material recessed stripe portion
20: Cylinder portion
31: First inner peripheral portion
31a: Portion on one side of first inner peripheral portion
31b: Portion on other side of first inner peripheral portion
32: Second inner peripheral portion
32a: Portion on one side of second inner peripheral portion
32b: Portion on other side of second inner peripheral portion
33: recessed stripe portion (of the cylinder portion)
50: Cutting tool
51: Cutting portion

TABLE 1

| | Cross-sectional shape of pillar portion 2 | No. of first outer peripheral portions 11 | Angle θ (°) | Young's modulus of base material 1 | Young's modulus of cylinder portion 20 | Life cutting length (m) |
|---|---|---|---|---|---|---|
| Example 1 | regular triangle | 3 | 60 | 570 GPa | 920 GPa | 16 |
| Example 2 | regular hexagon | 6 | 30 | 570 GPa | 920 GPa | 24 |
| Example 3 | regular octagon | 8 | 22.5 | 570 GPa | 920 GPa | 30 |
| Example 4 | regular dodecagon | 12 | 15 | 570 GPa | 920 GPa | 26 |
| Example 5 | regular octadecagon | 18 | 10 | 570 GPa | 920 GPa | 22 |
| Example 6 | regular 24-gon | 24 | 7.5 | 570 GPa | 920 GPa | 19 |
| Comparative Example | circle | 0 | — | 570 GPa | 920 GPa | 12 |

As shown in Table 1, in Examples 1 to 6 of the present invention, the life cutting lengths are all 16 m or longer. Compared to the comparative example, it is possible to prevent the occurrence of cracks or chips in the interface between the base material and the cylinder portion or the cylinder portion. It was confirmed that the tool life can be extended. Out of the examples, the examples 2 to 5 had an excellent cutting life length of 22 m or longer. In particular, the example 3 had an excellent cutting life length of 30 m.

52: Shank
55: Chip discharge groove
56: Cutting edge
C: Central axis
L1: First straight line
L2: Second straight line
R1: One side in circumferential direction
R2: Other side in circumferential direction
θ, θ': angle

What is claimed is:

1. A hard sintered body comprising:
a base material for a hard sintered body including a pillar portion having a central axis and extending in an axial direction of the central axis; and
a cylinder portion having a cylindrical shape that covers the pillar portion from an outside in a radial direction, having a lower coefficient of linear expansion and a higher hardness than the base material for the hard sintered body, and sintered integrally with the base material for the hard sintered body,
wherein the pillar portion has;
　　a first outer peripheral portion disposed in an outer peripheral portion of the pillar portion, and forming a part of the outer peripheral portion,
　　a second outer peripheral portion disposed in the outer peripheral portion of the pillar portion, and forming a part of the outer peripheral portion, and
　　a protruding stripe portion of the base material located in a connection portion between the first outer peripheral portion and the second outer peripheral portion which are connected to each other in a cross-sectional view perpendicular to the central axis, and extending in the axial direction,
in the cross-sectional view, one side portion of the first outer peripheral portion extending in a circumferential direction or the radial direction is located inside an other side portion of the first outer peripheral portion in the radial direction,
in the cross-sectional view, one side portion of the second outer peripheral portion extending in the circumferential direction or the radial direction is located outside an other side portion of the second outer peripheral portion in the radial direction,
the protruding stripe portion of the base material is located in a connection portion between the other side portion of the first outer peripheral portion and the one side portion of the second outer peripheral portion, and protrudes outward in the radial direction,
the cylinder portion has;
　　a first inner peripheral portion disposed in an inner peripheral portion of the cylinder portion, and forming a part of the inner peripheral portion,
　　a second inner peripheral portion disposed in an inner peripheral portion of the cylinder portion, and forming a part of the inner peripheral portion, and
　　a recessed stripe portion of the cylinder portion located in the connection portion between the first inner peripheral portion and the second inner peripheral portion which are connected to each other in the cross-sectional view, and extending in the axial direction,
in the cross-sectional view, one side portion of the first inner peripheral portion extending in the circumferential direction or the radial direction is located inside an other side portion of the first inner peripheral portion in the radial direction,
in the cross-sectional view, one side portion of the second inner peripheral portion extending in the circumferential direction or the radial direction is located outside an other side portion of the second inner peripheral portion in the radial direction,
the recessed stripe portion of the cylinder portion is located in a connection portion between the other side portion of the first inner peripheral portion and the one side portion of the second inner peripheral portion, and is recessed outward in the radial direction,
the first outer peripheral portion and the first inner peripheral portion are bonded to each other,
the second outer peripheral portion and the second inner peripheral portion are bonded to each other,
the protruding stripe portion of the base material and the recessed stripe portion of the cylinder portion are bonded to each other,
in the cross-sectional view, an angle at which the first outer peripheral portion is inclined with respect to a second straight line is 4° or larger and 90° or smaller, where the second line being orthogonal to a first straight line passing through an outer end portion of the first outer peripheral portion and the central axis, and extending in the radial direction, and
in the cross-sectional view, the first outer peripheral portion has a concave curve shape, and the second outer peripheral portion has a concave curve shape.

2. The hard sintered body according to claim 1,
wherein a plurality of the first outer peripheral portions are provided at an interval from each other in the circumferential direction, and
in the cross-sectional view, all of the angles of the plurality of first outer peripheral portions are equal to each other.

3. The hard sintered body according to claim 1,
wherein the base material for the hard sintered body has a Young's modulus of 300 GPa or higher, and
the cylinder portion has a Young's modulus of 600 GPa or higher.

4. The hard sintered body according to claim 1,
wherein the base material for the hard sintered body is made of any one of cemented carbide, cermet, and ceramics, and
the cylinder portion is made of any one of polycrystalline diamond and polycrystalline cubic boron nitride.

5. The hard sintered body according to claim 1, wherein the angle is 10° or larger and 30° or smaller.

6. A cutting tool comprising:
a cutting portion in which a chip discharge groove and a cutting edge which extend in an axial direction are provided in an outer peripheral portion of the hard sintered body according to claim 1; and
a shank connected to the cutting portion in the axial direction,
wherein the cutting edge is disposed in the cylinder portion.

7. The cutting tool according to claim 6,
wherein when viewed in the radial direction, the other side portion of the first outer peripheral portion and the cutting edge intersect with each other.

8. The cutting tool according to claim 6,
wherein a plurality of the first outer peripheral portions are provided at an interval from each other in the circumferential direction,
one or more of the cutting edges are provided, and
the number of the first outer peripheral portions is equal to or more than the number of the cutting edges.

* * * * *